United States Patent
Hauser

(10) Patent No.: US 7,702,603 B1
(45) Date of Patent: *Apr. 20, 2010

(54) CONSTRUCTING AN AGENT THAT UTILIZES A COMPILED SET OF CANONICAL RULES

(76) Inventor: Robert R. Hauser, 4134 Nobleman Dr., Frisco, TX (US) 75034

( * ) Notice: Subject to any disclaimer, the term of this patent is extended or adjusted under 35 U.S.C. 154(b) by 427 days.

This patent is subject to a terminal disclaimer.

(21) Appl. No.: 11/645,302

(22) Filed: Dec. 22, 2006

(51) Int. Cl.
*G06F 15/18* (2006.01)

(52) U.S. Cl. .................................................. 706/45

(58) Field of Classification Search .......... None
See application file for complete search history.

(56) References Cited

U.S. PATENT DOCUMENTS

| | | | |
|---|---|---|---|
| 4,714,995 A | 12/1987 | Materna et al. | |
| 5,495,533 A | 2/1996 | Linehan et al. | |
| 5,524,253 A | 6/1996 | Pham et al. | |
| 5,604,800 A | 2/1997 | Johnson et al. | |
| 5,721,912 A | 2/1998 | Stepczyk et al. | |
| 5,778,395 A | 7/1998 | Whiting et al. | |
| 5,812,997 A | 9/1998 | Morimoto et al. | |
| 5,859,911 A | 1/1999 | Angelo et al. | |
| 5,930,798 A | 7/1999 | Lawler et al. | |
| 5,982,891 A | 11/1999 | Ginter et al. | |
| 6,038,500 A | 3/2000 | Weiss | |
| 6,055,562 A * | 4/2000 | Devarakonda et al. | 709/202 |
| 6,065,040 A * | 5/2000 | Mima et al. | 709/202 |
| 6,088,689 A * | 7/2000 | Kohn et al. | 706/10 |
| 6,113,650 A | 9/2000 | Sakai | |
| 6,134,580 A * | 10/2000 | Tahara et al. | 709/202 |
| 6,134,660 A | 10/2000 | Boneh et al. | |
| 6,154,777 A | 11/2000 | Ebrahim | |
| 6,199,195 B1 | 3/2001 | Goodwin et al. | |
| 6,202,060 B1 * | 3/2001 | Tran | 707/3 |
| 6,209,124 B1 | 3/2001 | Vermeire et al. | |
| 6,230,309 B1 | 5/2001 | Turner et al. | |
| 6,233,601 B1 * | 5/2001 | Walsh | 709/202 |
| 6,256,773 B1 | 7/2001 | Bowman-Amuah | |
| 6,272,478 B1 | 8/2001 | Obata et al. | |
| 6,282,563 B1 | 8/2001 | Yamamoto et al. | |
| 6,282,697 B1 | 8/2001 | Fables et al. | |
| 6,330,677 B1 | 12/2001 | Madoukh | |
| 6,343,265 B1 | 1/2002 | Glebov et al. | |
| 6,349,343 B1 | 2/2002 | Foody et al. | |
| 6,389,462 B1 | 5/2002 | Cohen et al. | |
| 6,438,744 B2 | 8/2002 | Toutonghi et al. | |
| 6,442,537 B1 * | 8/2002 | Karch | 706/50 |
| 6,496,871 B1 * | 12/2002 | Jagannathan et al. | 719/317 |
| 6,600,430 B2 | 7/2003 | Minagawa et al. | |
| 6,600,975 B2 | 7/2003 | Moriguchi et al. | |
| 6,629,032 B2 | 9/2003 | Akiyama | |

(Continued)

OTHER PUBLICATIONS

Emmerich, et al., "TIGRA—An Architectural Style for Enterprise Application Integration", *IEEE*, (Jul. 2001), pp. 567-576.

(Continued)

*Primary Examiner*—David R Vincent
*Assistant Examiner*—Ola Olude-Afolabi

(57) ABSTRACT

A method for constructing an agent in a first execution environment that utilizes a set of compiled, canonical rules, comprising requesting a canonical rule set for the agent, compiling the rule set and supplying the agent with the compiled rule set.

17 Claims, 25 Drawing Sheets

U.S. PATENT DOCUMENTS

| | | |
|---|---|---|
| 6,629,128 B1 | 9/2003 | Glass |
| 6,662,642 B2 | 12/2003 | Breed et al. |
| 6,671,680 B1 | 12/2003 | Iwamoto et al. |
| 6,687,761 B1 | 2/2004 | Collins et al. |
| 6,701,381 B2 | 3/2004 | Hearne et al. |
| 6,714,844 B1 | 3/2004 | Dauner et al. |
| 6,738,975 B1 | 5/2004 | Yee et al. |
| 6,744,352 B2 | 6/2004 | Lesesky et al. |
| 6,744,358 B1 | 6/2004 | Bollinger |
| 6,744,820 B1 | 6/2004 | Khairallah et al. |
| 6,768,417 B2 | 7/2004 | Kuragaki et al. |
| 6,816,452 B1 | 11/2004 | Maehata |
| 6,831,375 B1 | 12/2004 | Currie et al. |
| 6,862,443 B2 | 3/2005 | Witte |
| 6,876,845 B1 | 4/2005 | Tabata et al. |
| 6,901,588 B1 | 5/2005 | Krapf et al. |
| 6,904,593 B1 | 6/2005 | Fong et al. |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 | 10/2005 | Lewallen |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 * | 5/2006 | Olson et al. ............... 709/202 |
| 7,047,518 B2 | 5/2006 | Little et al. |
| 7,055,153 B2 | 5/2006 | Beck et al. |
| 7,058,645 B2 | 6/2006 | Seto et al. |
| 7,062,708 B2 | 6/2006 | Mani et al. |
| 7,069,551 B2 | 6/2006 | Fong et al. |
| 7,127,724 B2 | 10/2006 | Lewallen |
| 7,146,614 B1 | 12/2006 | Nikols et al. |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 | 3/2007 | Arita et al. |
| 7,210,132 B2 | 4/2007 | Rivard et al. |
| 7,213,227 B2 | 5/2007 | Kompalli et al. |
| 7,225,425 B2 | 5/2007 | Kompalli et al. |
| 7,231,403 B1 | 6/2007 | Howitt et al. |
| 7,237,225 B2 | 6/2007 | Kompalli et al. |
| 7,293,261 B1 | 11/2007 | Anderson et al. |
| 7,376,959 B2 | 5/2008 | Warshavsky et al. |
| 7,475,107 B2 * | 1/2009 | Maconi et al. ............... 709/202 |
| 7,566,002 B2 | 7/2009 | Love et al. |
| 7,660,777 B1 | 2/2010 | Hauser |
| 7,660,780 B1 | 2/2010 | Patoskie |
| 7,664,721 B1 | 2/2010 | Hauser |
| 2002/0032783 A1 | 3/2002 | Tuatini |
| 2002/0091680 A1 | 7/2002 | Hatzis et al. |
| 2002/0116454 A1 | 8/2002 | Dyla et al. |
| 2002/0174222 A1 * | 11/2002 | Cox ........................... 709/224 |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 | 2/2003 | Fischer et al. |
| 2003/0046377 A1 | 3/2003 | Daum et al. |
| 2003/0046432 A1 * | 3/2003 | Coleman et al. ............ 709/247 |
| 2003/0070071 A1 | 4/2003 | Riedel et al. |
| 2003/0101441 A1 | 5/2003 | Harrison et al. |
| 2003/0177170 A1 | 9/2003 | Glass |
| 2003/0191797 A1 * | 10/2003 | Gurevich et al. ............ 709/200 |
| 2003/0191969 A1 | 10/2003 | Katsikas |
| 2003/0225789 A1 | 12/2003 | Bussler et al. |
| 2004/0003243 A1 | 1/2004 | Fehr et al. |
| 2004/0015539 A1 | 1/2004 | Alegria et al. |
| 2004/0044985 A1 | 3/2004 | Kompalli et al. |
| 2004/0044986 A1 | 3/2004 | Kompalli et al. |
| 2004/0044987 A1 | 3/2004 | Kompalli et al. |
| 2004/0064503 A1 | 4/2004 | Karakashian et al. |
| 2004/0078423 A1 | 4/2004 | Satyavolu et al. |
| 2004/0082350 A1 | 4/2004 | Chen et al. |
| 2004/0111730 A1 | 6/2004 | Apte |
| 2004/0172614 A1 | 9/2004 | Gallagher |
| 2004/0194072 A1 | 9/2004 | Venter |
| 2004/0203731 A1 | 10/2004 | Chen et al. |
| 2004/0221292 A1 | 11/2004 | Chiang et al. |
| 2005/0004727 A1 | 1/2005 | Remboski et al. |
| 2005/0030202 A1 | 2/2005 | Tsuboi |
| 2005/0090279 A9 | 4/2005 | Witkowski et al. |
| 2005/0114832 A1 | 5/2005 | Manu |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0262155 A1 | 11/2005 | Kress et al. |
| 2006/0005177 A1 | 1/2006 | Atkin et al. |
| 2006/0048145 A1 | 3/2006 | Celli et al. |
| 2006/0080646 A1 | 4/2006 | Aman |
| 2006/0090103 A1 | 4/2006 | Armstrong et al. |
| 2006/0143600 A1 | 6/2006 | Cottrell et al. |
| 2006/0149746 A1 | 7/2006 | Bansod et al. |
| 2006/0167981 A1 | 7/2006 | Bansod et al. |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |

OTHER PUBLICATIONS

Bussler, Christoph "The Role of B2B Engines in B2B Integration Architectures", *ACM* (Mar. 2002), 67-72.

Jandl, et al., "Enterprise Application Integration by means of a generic CORBA LDAP Gateway", *ACM* (May 2002), 711.

Sutherland, et al., "Enterprise Application Integration and Complex Adaptive Systems", *ACM* (Oct. 2002), 59-64.

Ballance, et al., "The Pan Language-Based Editing System for Integrated Development Environments", *ACM* (Oct. 1990),77-93.

Dilts, et al., "An Inteligent Interface to CIM Multiple Data Bases", *ACM, TALIP*, (Mar. 2004),vol. 3 Issue 1, pp. 491-509.

Praet, et al., "Processor Modeling and Code Selection for Retargetable Compilation", July 2001, *ACM, TODAES* vol. 6, Issue 3, (Jul. 2001), pp. 277-307.

Flanagan, Roxy "Graphic + Internet related tutorials Using Winzip", indexed by www.archive.org, (Oct. 30, 2008), 8 pages.

"Stuffit Deluxe", Aladdin Systems,( Jan. 1, 2004),83 pages.

Gu, T. et al., "Toward an OSGi-based infrastructure for context-aware applications", U.S. Appl. No. 11/645,190, Pervasive Computing IEEE, vol. 3, Issue 4. Digital Object Identifier 10.1109/MPRV.2004. 19,(Oct.-Dec. 2004),9 pages.

Pantic, M et al., "Simple agent framework: an educational tool introducing the basics of AI programming", U.S. Appl. No. 11/645,190, Information Technology: Research and Education, 2003. Proceedings. ITRE2003.,(Aug. 11-13, 2003),426-430.

Singh, V.K. et al., "DYSWIS: An architecture for automated diagnosis of networks", U.S. Appl. No. 11/645,190, Operations and Management Symposium, 2008. NOMS 2008. IEEE,(Apr. 7-11, 2008),851-854.

"Final Office Action", U.S. Appl. No. 10/975,827, (Nov. 23, 2009), 17 pages.

"Final Office Action", U.S. Appl. No. 10/975,146, (Dec. 1, 2009), 11 pages.

"Non Final Office Action", U.S. Appl. No. 10/975,623, (Nov. 12, 2009), 17 pages.

Blackwell, John "Remit—Rule-Based Alert Management Information Tool", *Thesis, Florida State University College of Arts and Sciences*, (2004), pp. 1-69.

Lockemann, Peter C., "Agents and Databases: Friends or Foes?", *Proceedings of the 9th International Database Engineering & Application Symposium (IDEAS '05)*, (2005), 11 pages.

Forte, "Feature Comparison of Agent and Free Agent", Retrieved from: <www.forteinc.com/agent/features.php> on Jan. 26, 2010, (2002), 3 pages.

Russell, Stuart et al., "Artificial Intelligence: A Modern Approach", *Pearson*, (2003), pp. 5, 32-56, 449-454.

Stallings, William "ISDN and Broadband ISDN with Framw Relay and ATM", *Prentice-Hall*, (1999), p. 516.

\* cited by examiner

CONSTRUCTING AN AGENT THAT UTILIZES A COMPILED SET OF CANONICAL RULES

FIELD OF THE INVENTION

The present invention is generally related to software agents and more particularly to software agents' use of rule-based systems.

BACKGROUND OF THE INVENTION

Agents

A software agent is a software abstraction, similar to the object-oriented programming concept of an object. The concept of an agent provides a convenient and powerful way to describe a complex software entity that is capable of acting with a certain degree of autonomy in order to accomplish tasks on behalf of its user. But unlike objects, which are defined in terms of methods and attributes, an agent is defined in terms of its behavior.

Various authors have proposed different definitions of agents, commonly including concepts such as:
- Persistence—code is not executed on demand but runs continuously and decides for itself when it should perform some activity
- Autonomy—agents have capabilities of task selection, prioritization, goal-directed behavior, decision-making without human intervention
- Social Ability—agents are able to engage other components through communication and coordination, they may collaborate on a task
- Reactivity—agents perceive the context in which they operate and react to it appropriately.

Agents may also be mobile. They can move from one execution environment to another carrying both their code and their execution state. These execution environments can exist in a variety of devices in a data network including, but not limited to, servers, desktops, laptops, embedded devices, networking equipment and edge devices such as PDAs or cell phones. The characteristics of these platforms may vary widely in terms of computational capacity, networking capacity, display capabilities, etc. An agent must be able to adapt to these conditions.

Historically, agents have been programmed in a procedural manner. That is, agents are programmed with a series of steps that will ultimately result in a goal being achieved. This approach has limitations though as the logic for each agent must be compiled into the agent software and is therefore static. Complex goals can also become intractable for a programmer as the set of rules the agent must follow grows.

Rule-Based Systems

In his tutorial, Introduction to Rule-Based Systems, James Freeman-Hargis defines a rule-based system to consist of a set of assertions and a set of rules for how to act on the assertion set. When a set of data is supplied to the system, it may result in zero or more rules firing. Rule based systems are rather simplistic in nature, consisting of little more than a group of if-then statements, but form the basis of many "expert systems." In an expert system, the knowledge of an expert is encoded into the rule-set. When a set of data is supplied to the system, the system will come to the same conclusion as the expert. With this approach there is a clear separation between the domain logic (a rule set) and the execution of the agent. As mentioned, the procedural agent approach tightly couples the two.

The rule-based system itself uses a simple technique. It starts with a rule-set, which contains all of the appropriate knowledge encoded into If-Then rules, and a working memory, which may or may not initially contain any data, assertions or initially known information. The system in operation examines all the rule conditions (IF) and determines a subset, the conflict set, of the rules whose conditions are satisfied based on the working memory. Of this conflict set, one of those rules is triggered (fired). The rule that is chosen is based on a conflict resolution strategy. When the rule is fired, any actions specified in its THEN clause are carried out. These actions can modify the working memory, the rule-set itself, or do just about anything else the system programmer decides to include. This loop of firing rules and performing actions continues until one of two conditions are met: there are no more rules whose conditions are satisfied or a rule is fired whose action specifies the rule engine execution should terminate.

Rule-based systems, as defined above, are adaptable to a variety of problems. In some problems, working memory asserted data is provided with the rules and the system follows them to see where they lead. This approach is known as forward-chaining. An example of this is a medical diagnosis in which the problem is to diagnose the underlying disease based on a set of symptoms (the working memory). A problem of this nature is solved using a forward-chaining, data-driven, system that compares data in the working memory against the conditions (IF parts) of the rules and determines which rules to fire.

In other problems, a goal is specified and the system must find a way to achieve that specified goal. This is known as backward-chaining. For example, if there is an epidemic of a certain disease, this system could presume a given individual had the disease and attempt to determine if its diagnosis is correct based on available information. A backward-chaining, goal-driven, system accomplishes this. To do this, the system looks for the action in the THEN clause of the rules that matches the specified goal. In other words, it looks for the rules that can produce this goal. If a rule is found and fired, it takes each of that rule's conditions as goals and continues until either the available data satisfies all of the goals or there are no more rules that match.

The Rete algorithm is an efficient pattern matching algorithm for implementing forward-chaining, rule-based systems. The Rete algorithm was designed by Dr. Charles L. Forgy of Carnegie Mellon University in 1979. Rete has become the basis for many popular expert systems, including JRules, OPS5, CLIPS, JESS, Drools, and LISA.

A naïve implementation of a rule-based system might check each rule against the known facts in the knowledge base, firing that rule if necessary, then moving on to the next rule (and looping back to the first rule when finished). For even moderate sized rules and fact knowledge-bases, this naïve approach performs far too slowly.

The Rete algorithm (usually pronounced either 'REET' or 'REE-tee', from the Latin 'rete' for net, or network) provides the basis for a more efficient implementation of an expert system. A Rete-based expert system builds a network of nodes, where each node (except the root) corresponds to a pattern occurring in the left-hand-side of a rule. The path from the root node to a leaf node defines a complete rule left-hand-side. Each node has a memory of facts which satisfy that pattern.

As new facts are asserted or modified, they propagate along the network, causing nodes to be annotated when that fact matches that pattern. When a fact or combination of facts causes all of the patterns for a given rule to be satisfied, a leaf node is reached and the corresponding rule is triggered.

The Rete algorithm is designed to sacrifice memory for increased speed. In most cases, the speed increase over naïve implementations is several orders of magnitude (because Rete performance is theoretically independent of the number of rules in the system). In very large systems, however, the original Rete algorithm tends to run into memory consumption problems which have driven the design of Rete variants.

Therefore, what is needed is an ability to construct an agent with a set of compiled rules. More specifically what is needed is construction of an agent with a supplied set of compiled, canonical rules that will be executed in a rule based system.

SUMMARY OF THE INVENTION

The present invention provides a system, method, and computer readable medium for constructing an agent that utilizes a compiled set of canonical rules.

In one embodiment of the present invention, a method for constructing an agent in a first execution environment that utilizes a set of compiled, canonical rules, comprising requesting a canonical rule set for the agent, compiling the rule set and supplying the agent with the compiled rule set. The method may also comprise an application requesting the rule set. The method may additionally comprise requesting a non-compiled, canonical rule set from a rule repository. The method may further comprise requesting compilation of the rule set from a compiler. The method may also comprise requesting the compiled rule set from a rule server. Wherein a rule server is utilized, the method may also comprise the rule server requesting the canonical rule set from a rule repository. Wherein a rule server is utilized, the method may additionally comprise the rule server requesting compilation of the canonical rule set from a compiler. The method may further comprise passing the compiled rule set to the agent during construction. Wherein an application requests construction, the method may also comprise the application residing in a second execution environment. Wherein a rule repository is utilized, the method may additionally comprise the rule repository residing in a third execution environment.

In another embodiment of the present invention, a computer readable medium comprising instructions for initiating construction of an agent in a first execution environment, requesting a set of compiled rules for the agent, creating a rule engine, passing the compiled rule set to the rule engine and requesting a working memory from the rule engine. The computer readable medium may also comprise instructions for supplying a location of a rule server to the agent during construction. The computer readable medium may additionally comprise instructions for requesting the set of compiled rules from a supplied rule server. Wherein a rule server is utilized, the computer readable medium may further comprise instructions in which the supplied rule server is in a second execution environment. The computer readable medium may also comprise steps for creating the rule engine during agent construction. The computer readable medium may additionally comprise steps for locating the rule engine during agent construction. The computer readable medium may further comprise instructions for the agent requesting the working memory from the rule engine.

In a further embodiment of the present invention, a system of agent construction with a set of compiled, canonical rules, comprising a first memory that stores a working memory and a first processor communicably coupled to the first memory, wherein the processor locates a canonical rule set, requests compilation of the rule set, passes the compiled rule set to the agent, locates a rule engine, supplies the rule engine with the compiled rule set and requests the working memory from the rule engine. The system may also comprise a second memory that stores an application and a second processor communicably coupled to the second memory, wherein the second processor executes the application that requests agent construction. The system may also comprise a third memory that stores a rule repository and a third processor communicably coupled to the third memory, wherein the third processor receives a rule set query, retrieves an appropriate canonical rule set, compiles the canonical rule set and sends a response containing the compiled rule set for the agent.

DETAILED DESCRIPTION OF THE INVENTION

Construction

Agents which utilize rule based systems may be constructed locally or remotely. In order to operate, these agents need an initial set of canonical rules that can be compiled and loaded into an associated rule engine. These rules can either be supplied at construction or a rule repository location can be supplied so that the rules may be fetched during construction or at a later time.

Figure 1:
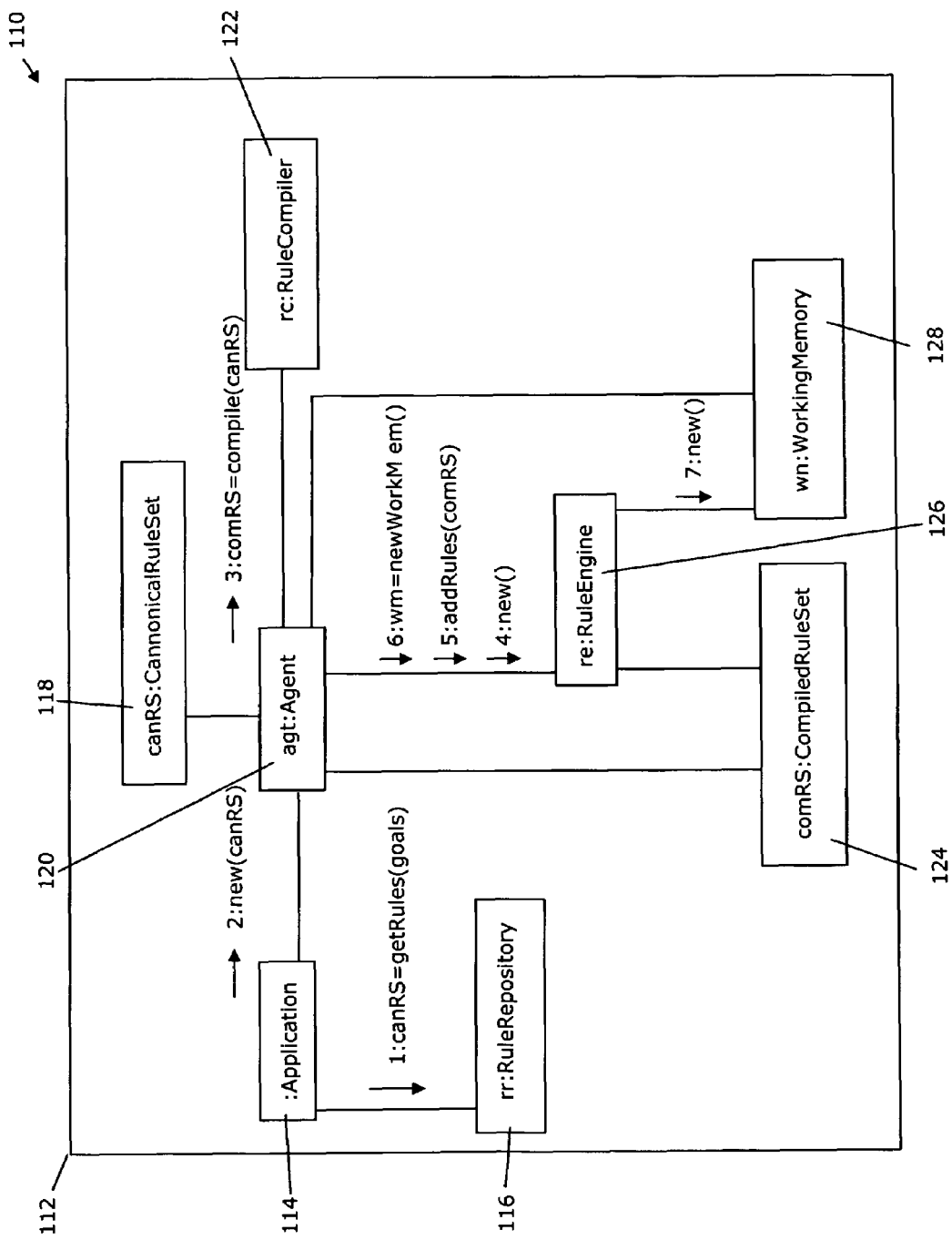
FIG. 1 is a diagram illustrating an exemplary process of constructing an agent locally with a set of canonical rules supplied during construction.

Referring now to FIG. 1, a diagram illustrating an exemplary process of constructing an agent locally with a set of canonical rules supplied during construction is shown. An application 110, in an execution environment 112, requests a set of rules for an agent from a rule repository 116 based on the goals of the agent that is being created. The result is a collection of canonical rules, known as a rule set 118. The rule set 118 is passed to the agent 120 during construction. The agent 120 takes the rule set 118 and requests that it be compiled by the local rule compiler 122. This results in the creation of a compiled rule set 124. At this point the agent creates the rule engine 126 that will be used to execute the rule set. Note that if the execution environment 112 includes a rule engine, then one may not need to be created. After the rule engine 126 is created or located, the agent 120 supplies the engine 126 with the compiled rule set 124. Finally, the agent 120 requests a new working memory 128 from the rule engine 126. The working memory will hold all of the data the agent chooses to assert before and during execution of the rule engine. At this point, the agent 120 is ready to be moved to another execution environment or to execute the rule engine. Both of these processes are described in detail in later sections.

Figure 2:
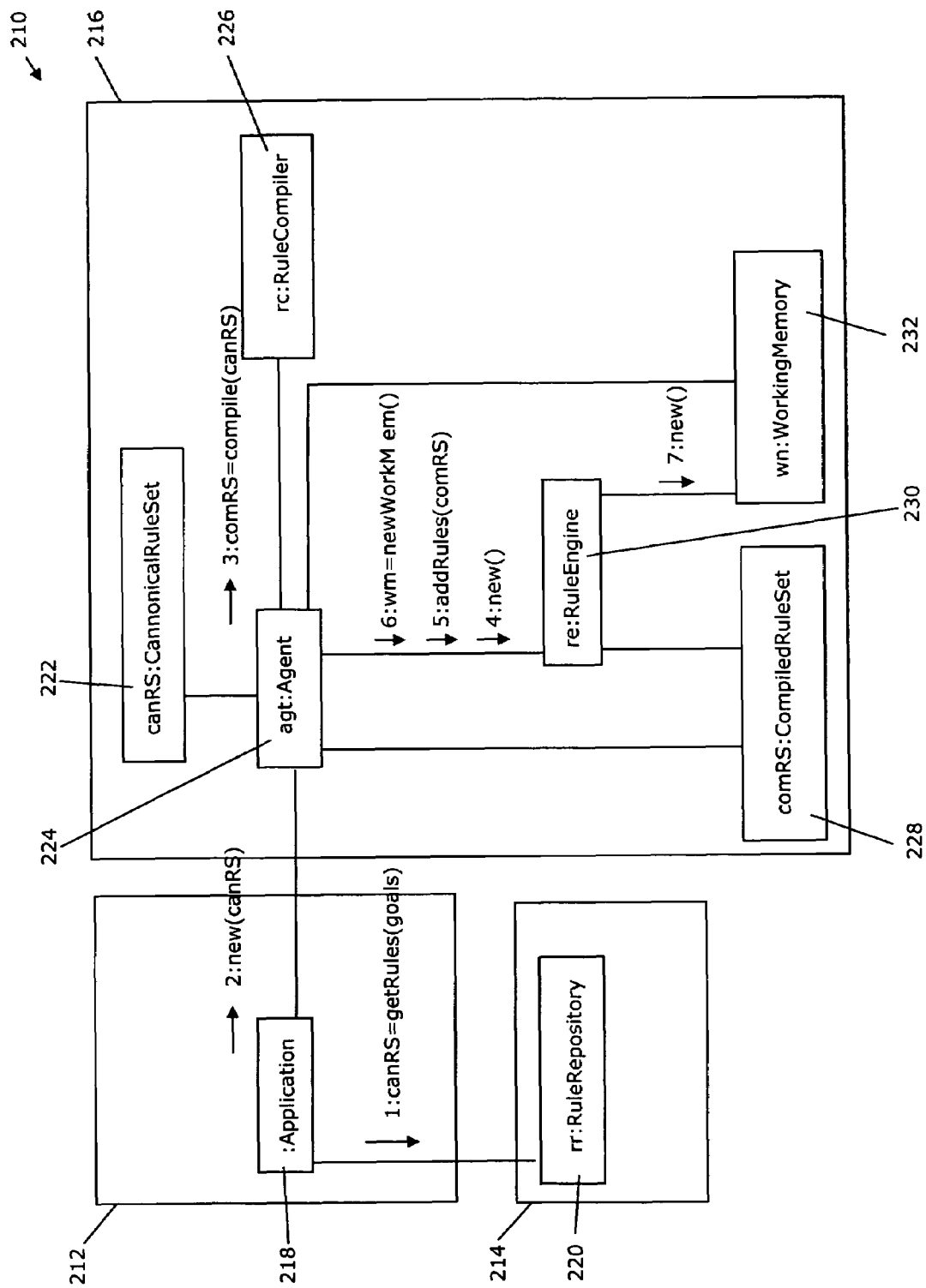
FIG. 2 is a diagram illustrating an exemplary process of constructing an agent remotely with a set of canonical rules supplied during construction.

Referring now to FIG. 2, a diagram illustrating an exemplary process of constructing an agent remotely with a set of canonical rules supplied during construction is shown. An application 218, in execution environment 212, requests a set of rules for an agent from a rule repository 220 in execution environment 214 based on the goals of the agent that is being created. The result is a collection of canonical rules, known as a rule set 222. The rule set 222 is passed to the agent 224 during construction in execution environment 216. The agent 224 in execution environment 216 takes the rule set 222 and requests that it be compiled by the local rule compiler 226. This results in the creation of a compiled rule set 228. At this point the agent creates the rule engine 230 that will be used to execute the rule set. Note that if execution environment 216 includes a rule engine, then one may not need to be created. After the rule engine 230 is created or located, the agent 224 supplies the engine 230 with the compiled rule set 228. Finally, the agent 224 requests a new working memory 232 from the rule engine 230. The working memory will hold all of the data the agent chooses to assert before and during execution of the rule engine. At this point, the agent 224 is ready to be moved to another execution environment or to execute the rule engine.

Figure 3:
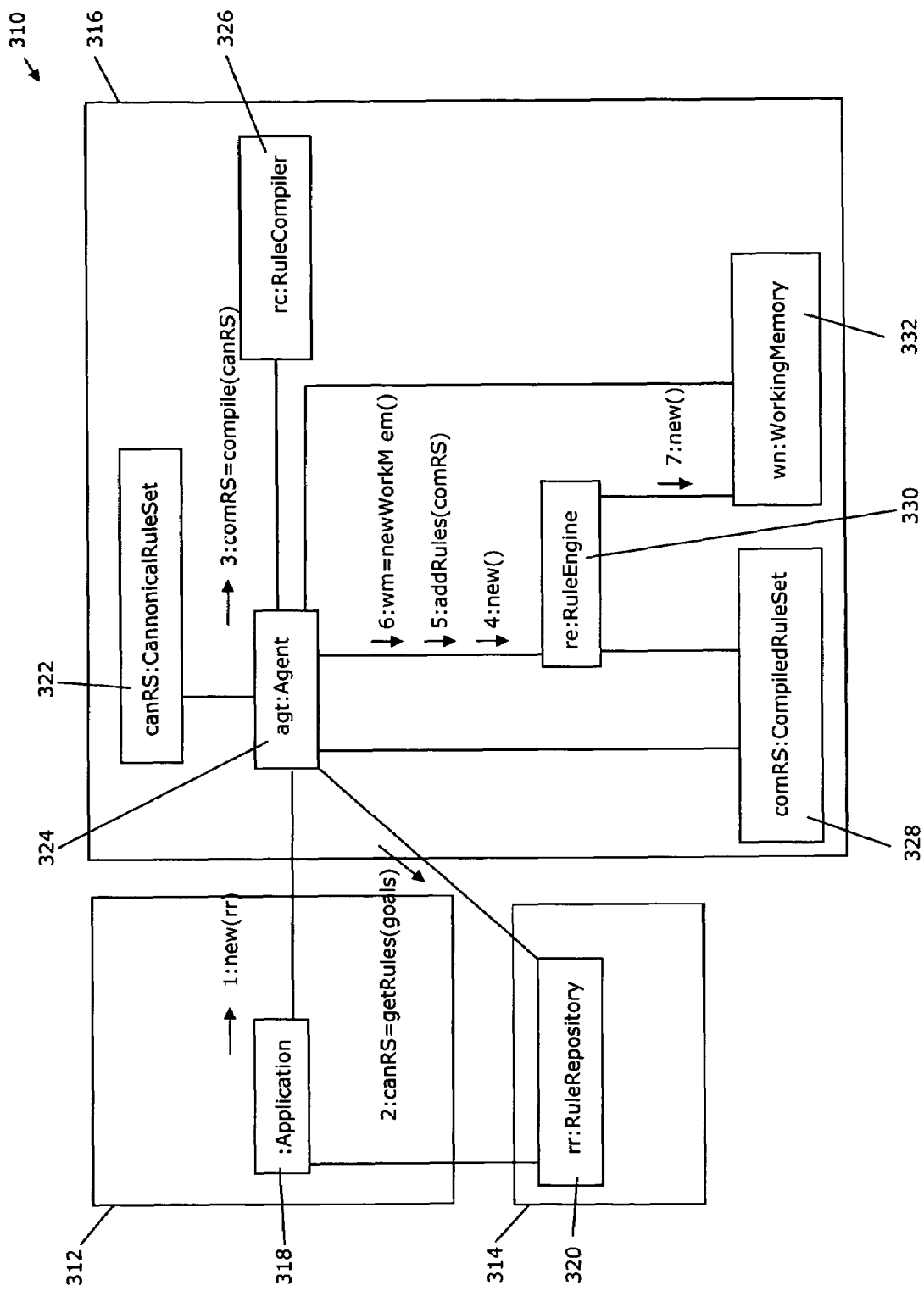
FIG. 3 is a diagram illustrating an exemplary process of constructing an agent in a remote execution environment during which a set of canonical rules is retrieved from outside the execution environment.

Referring now to FIG. 3, a diagram illustrating an exemplary process of constructing an agent in a remote execution environment during which a set of canonical rules is retrieved from outside the execution environment is shown. An application 318, in execution environment 312, requests the creation of an agent 324 in execution environment 316. Agent 324 is passed the location of a rule repository 320 during construction. During construction, the agent 324 requests a set of rules based on its goals from the rule repository 320 in execution environment 314. The result is a collection of canonical rules, known as a rule set 322. The agent 324 in execution environment 316 takes the rule set 322 and requests that it be compiled by the local rule compiler 326. This results in the creation of a compiled rule set 328. At this point the agent creates the rule engine 330 that will be used to execute the rule set. Note that if execution environment 314 includes a rule engine, then one may not need to be created. After the rule engine 330 is created or located, the agent 324 supplies the engine 330 with the compiled rule set 328. Finally, the agent 324 requests a new working memory 332 from the rule engine 330. The working memory will hold all of the data the agent chooses to assert before and during execution of the rule engine. At this point, the agent 324 is ready to be moved to another execution environment or to execute the rule engine.

Movement

An agent may move from one execution environment to another. This process may be initiated by a variety of means including but not limited to an application, another agent, another object, the existing agent itself, a human interacting with the execution environment or a rule executing in the agent's rule engine.

Figure 4:
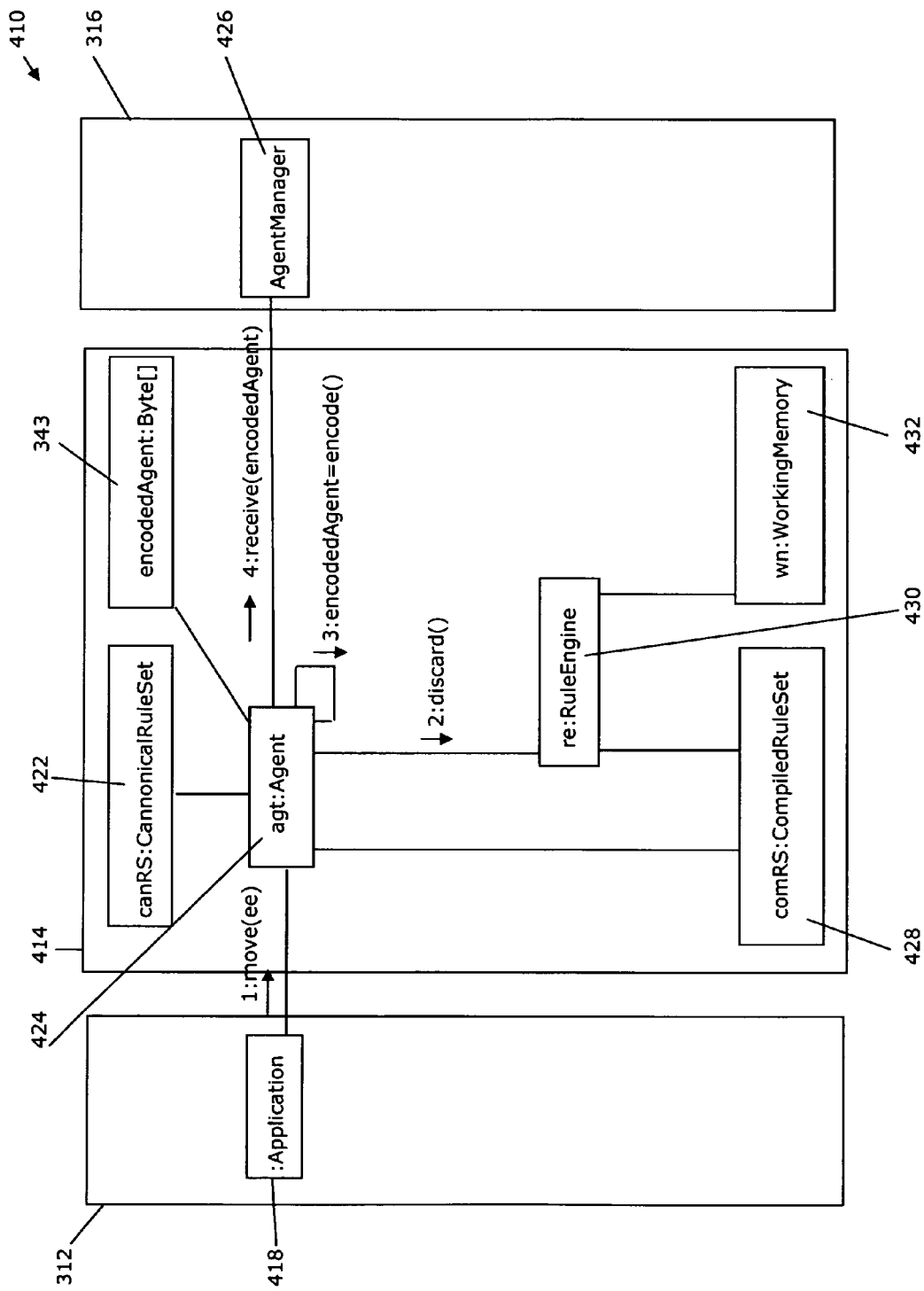
FIG. 4 is a diagram illustrating an exemplary process of moving an agent carrying canonical rules from a first execution environment.
Figure 5:
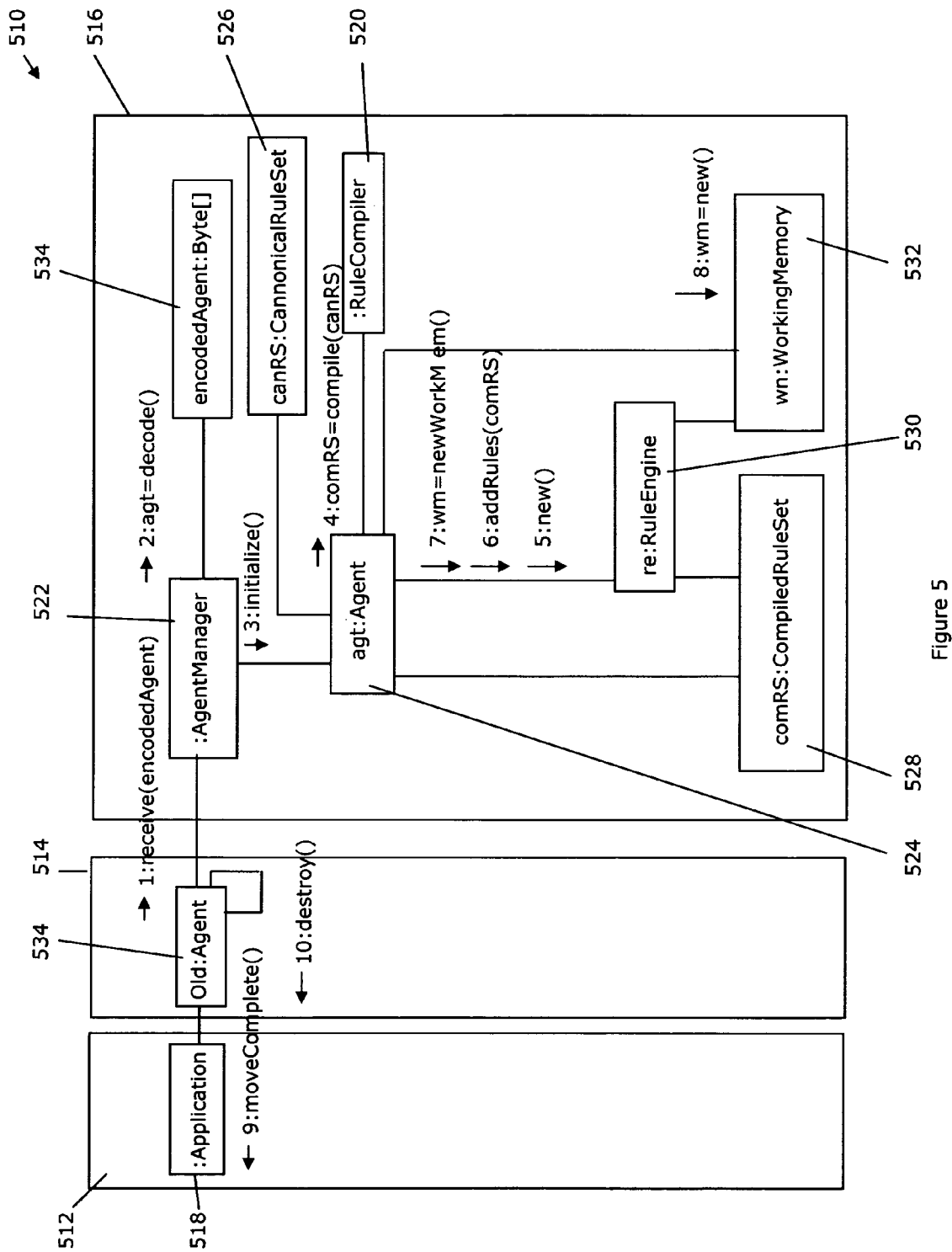
FIG. 5 is a diagram illustrating an exemplary process of moving an agent carrying canonical rules to a second execution environment.

Referring now to FIGS. 4 and 5, diagrams illustrating an exemplary process of moving an agent carrying canonical rules from one execution environment to another are shown. An application 418 in execution environment 412 requests that an agent 424 in execution environment 414 move to execution environment 416. The location of execution environment 416 may be described in the move request by an IP address and port, Uniform Resource Locator (URL), or any other means of addressing. The agent 424 discards its rule engine 430 along with the associated compiled rule set 428 and working memory 432. The agent 424 then encodes itself along with its canonical rule set 422 into a transferable form 434. Though a byte array is shown, the encoded agent could take any form that can be transferred between the two execution environments. Once the agent 424 has created an encoded version of itself 434 in execution environment 414 it transfers the encoded version 434 to an agent manager 426 residing in execution environment 416.

Referring now to FIG. 5, the process continues with the agent manager 522 receiving the encoded agent 534. Upon receipt of the encoded agent 534, the agent manager 522 decodes the encoded agent 534 into a new version of the agent 524 and its canonical rule set 526 in execution environment 516. Once the agent 524 and rule set 526 have been materialized, the agent manager 522 requests that the agent 524 initialize. This request prompts the agent 524 to go to the execution environment's rule compiler 520 and request compilation of its canonical rule set 526. The result is a compiled rule set 528. The agent then creates a new rule engine 530 and subsequently passes the compiled rule set 528 to it. As during construction, if the execution environment has a rule engine, then one may not need to be created. Once the engine 530 has been located/created and the compiled rule set 528 has been added to it, the agent 524 requests a new working memory from the rule engine. As before, the working memory will hold all of the data the agent chooses to assert before and during execution of the rule engine. At this point, the agent 524 is ready to execute the rule engine. Once the move operation completes, the old version of the agent 518 in execution environment 514 indicates to the requesting application 518 in execution environment 512 that the move operation has completed. Once the notification has been made, the old agent 534 is destroyed.

Execution

Once an agent has been initialized in an execution environment through either creation or movement, it can be sent requests to perform different tasks. These tasks may or may not require sending one or more responses. Recall that during construction an agent is associated with a newly created or resident rule engine and that a rule set is provided to that engine.

Figure 6:
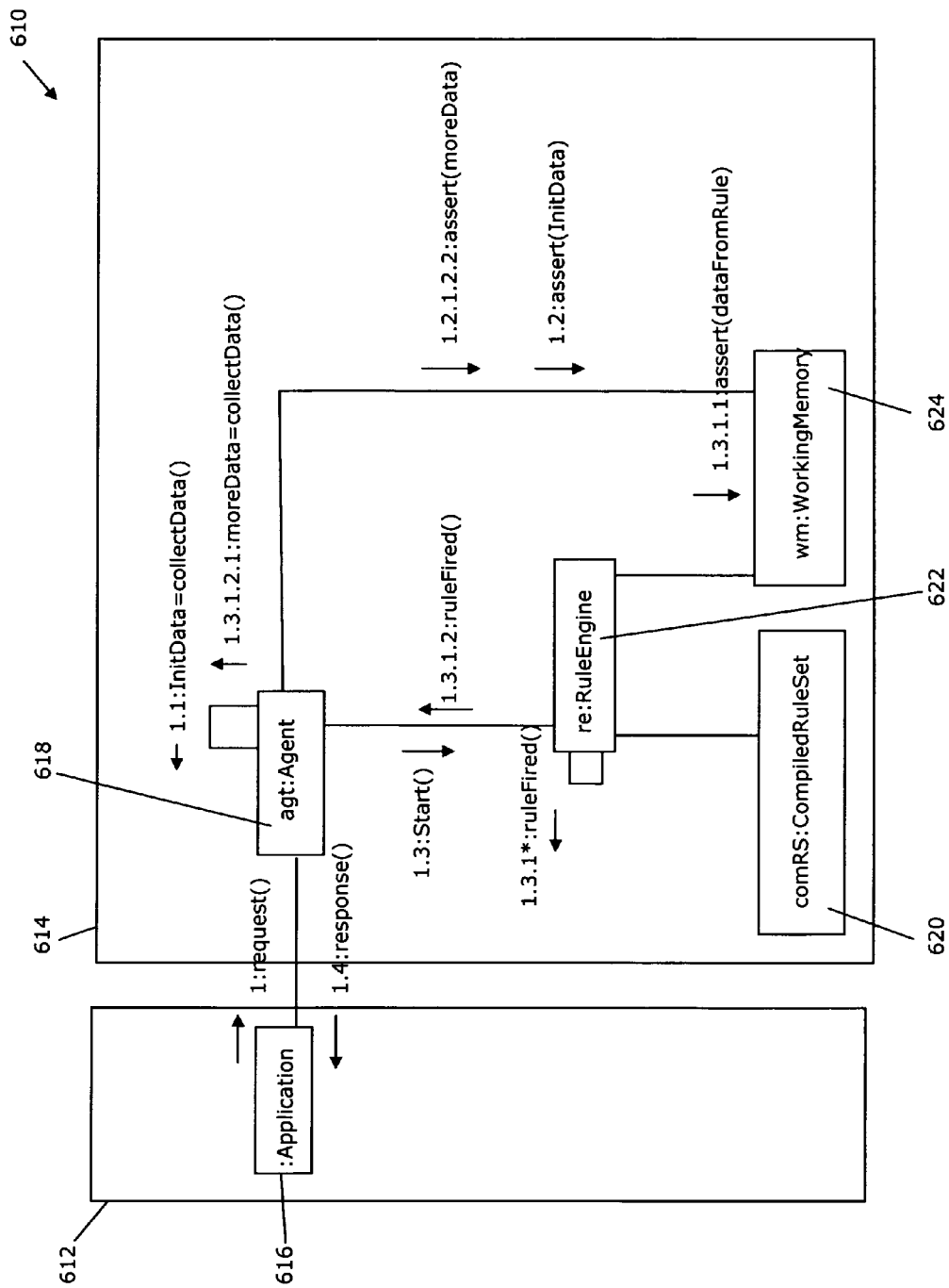
FIG. 6 is a diagram illustrating an exemplary process of an agent utilizing a rule-based system engine for execution.

Referring now to FIG. 6, a diagram illustrating an exemplary process of an agent utilizing a rule-based system engine for execution is shown. An application 616 in execution environment 612 sends a request to an agent 618 in execution environment 614. Upon receiving the request, the agent 618, collects an initial set of data and asserts it into its working memory 624 in order to accomplish the task requested. Note that this data may be collected from the local execution environment, from an accessible database, from other objects, from other agents, from a human via a man machine interface, from a computer readable medium or any combinations of the above. With a provided compiled rule set 620, and an initial set of data in working memory 624, the rule engine 622 is then started by the agent 618.

When the engine 622 starts, it processes the objects in working memory against the rule set 620. This may result in one or more rules being fired by the engine 622. When a rule is fired it may add, modify or delete objects in working memory 624. Additionally, the engine 622 can inform the agent 618 which may result in a number of actions being taken by the agent 618 including, but not limited to, the collection and assertion of additional data into the working memory 624 (shown) and/or sending of a preliminary response back to the application. This sequence will continue until the task is completed, there are no more rules available to fire, or the agent receives an event, such as move or terminate, causing it to halt rule engine processing. Upon completion of the task, the agent 618 may send a response back to the application 616 that initiated the request (shown).

Pre-Compiled Agent Rule Set Usage

As noted above, the process of adding rules to the rule engine can be expensive in terms of CPU utilization on the execution environment in which the operation is performed. This can be problematic for less powerful hosts such as personal devices (cell phones, PDAS, etc.) and servers with limited available CPU resources. Therefore, another embodiment of the invention creates the compiled rule set in the execution environment of the application that creates an agent instead of in the environment in which the agent is constructed or moved.

Figure 7:
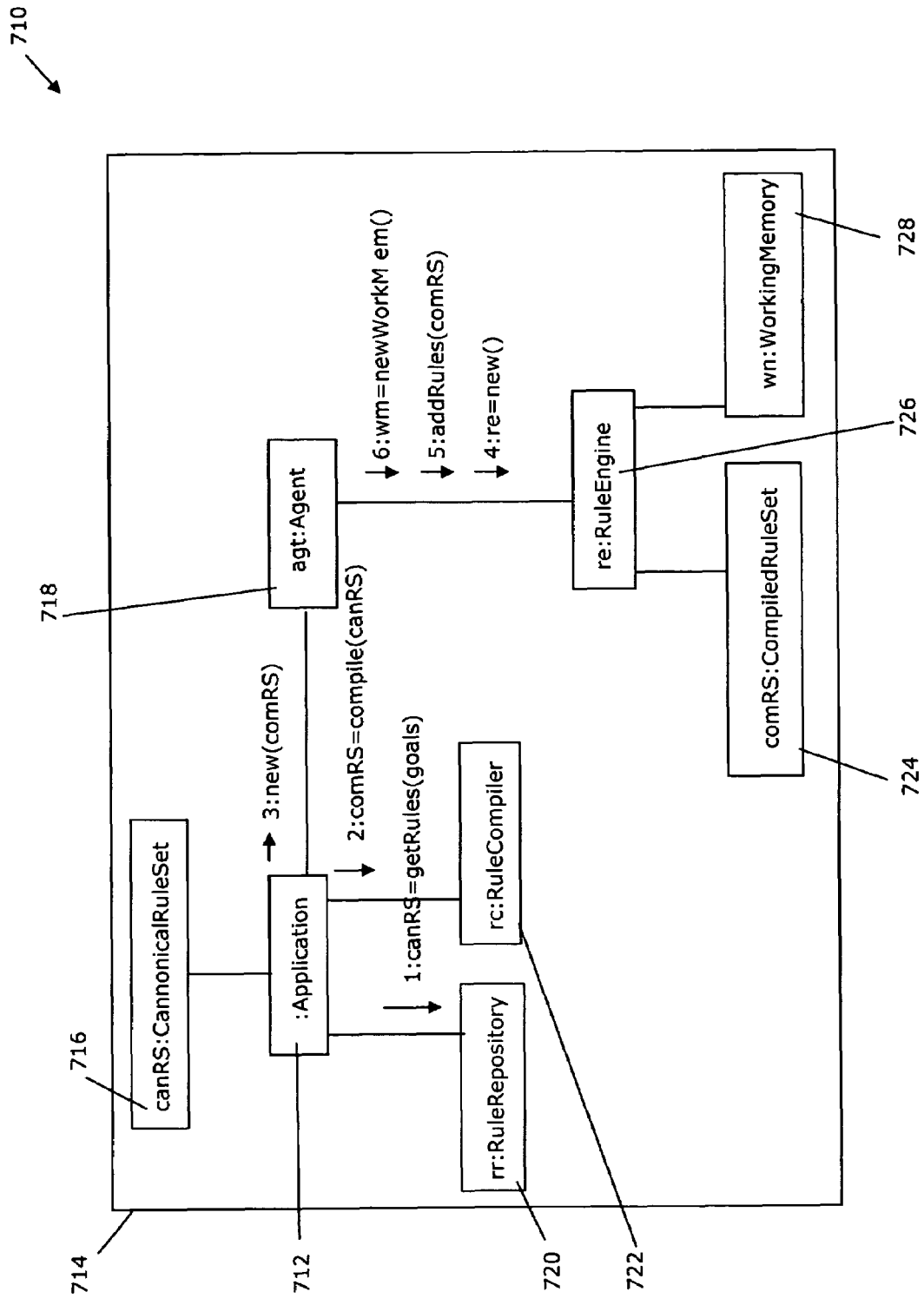
FIG. 7 is a diagram illustrating an exemplary process of constructing an agent locally with a set of compiled rules supplied during construction.

Referring now to FIG. 7, a diagram illustrating an exemplary process of constructing an agent locally with a set of compiled rules supplied during construction is shown. An application 712, in execution environment 714, requests a set of rules for an agent from a rule repository 720 based on the goals of the agent that is being created. The result is a collection of canonical rules, known as a rule set 724. The application 712 takes the rule set 724 and requests that it be compiled by the local rule compiler 722. This results in the creation of a compiled rule set 724. The rule set 724 is passed to the agent 718 during construction. At this point the agent creates the rule engine 726 that will be used to execute the rule set. Note that if the execution environment 714 includes a rule engine, then one may not need to be created. After the rule engine 726 is created or located, the agent 722 supplies the engine 726 with the compiled rule set 724. Finally, the agent 110 requests a new working memory 728 from the rule engine 726. The working memory will hold all of the data the agent chooses to assert before and during execution of the rule engine. At this point, the agent 718 is ready to be moved to another execution environment or to execute the rule engine.

Figure 8:
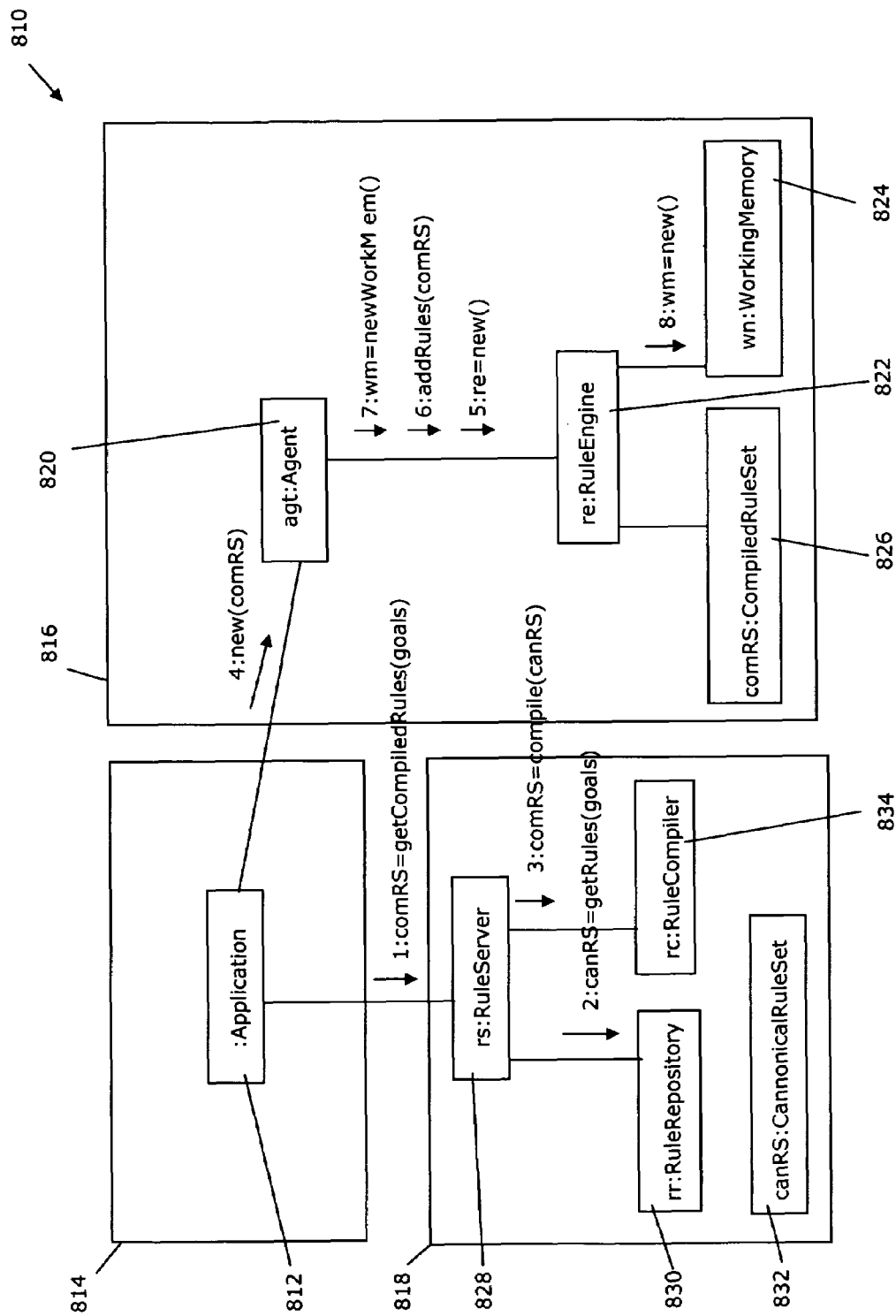
FIG. 8 is a diagram illustrating an exemplary process of constructing an agent remotely with a set of compiled rules supplied during construction.

Referring now to FIG. 8, a diagram illustrating an exemplary process of constructing an agent remotely with a set of compiled rules supplied during construction is shown. An application 812, in execution environment 814, requests a set of rules for an agent from a rule server 828 in execution environment 818 based on the goals of the agent that is being created. The rule server 828 queries a rule repository 830 for the rules. The result is a collection of canonical rules, known as a rule set 832. The rule server 828 in execution environment 202 takes the rule set 832 and requests that it be compiled by the local rule compiler 834. This results in the creation of a compiled rule set 826. The compiled rule set 826 is passed to the agent 820 during construction in execution environment 204. At this point, the agent 820 creates the rule engine 822 that will be used to execute the rule set. Note that if execution environment 816 includes a rule engine, then one may not need to be created. After the rule engine 822 is created or located, the agent 820 supplies the engine 822 with the compiled rule set 826. Finally, the agent 820 requests a new working memory 116 from the rule engine 822. The working memory will hold all of the data the agent chooses to assert before and during execution of the rule engine. At this point, the agent 820 is ready to execute the rule engine.

Figure 9:
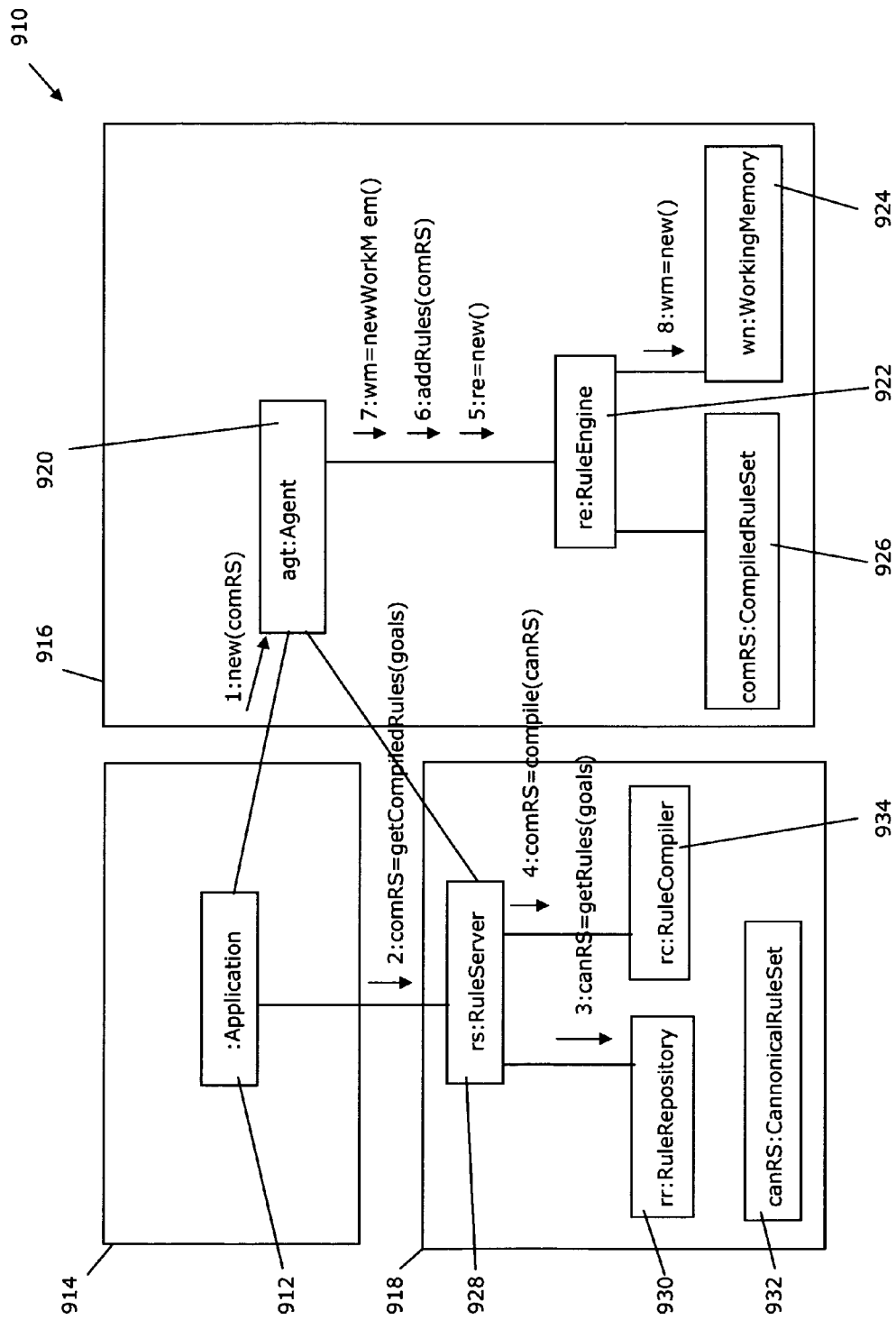
FIG. 9 is a diagram illustrating an exemplary process of constructing an agent remotely during which a set of compiled rules that are retrieved from outside the execution environment.

Referring now to FIG. 9, a diagram illustrating an exemplary process of constructing an agent in a remote execution environment during which a set of compiled rules is retrieved from outside the execution environment is shown. An application 912, in execution environment 914, requests the creation of an agent 920 in execution environment 916. Agent 920 is passed the location of a rule server 928, resident in execution environment 918, during construction. During construction, the agent 920 requests a set of compiled rules based on its goals from the rule server 928 in execution environment 918. The rule server 928 queries a rule repository 930 for a set of rules. The result is a collection of canonical rules, known as a rule set 932. The rule server 928 in execution environment 918 takes the rule set 932 and requests that it be compiled by the local rule compiler 934. This results in the creation of a compiled rule set 926. At this point the agent 920 creates a rule engine 922 that will be used to execute the rule set. Note that if execution environment 916 includes a rule engine, then one may not need to be created. After the rule engine 922 is created or located, the agent 920 supplies the engine 922 with the compiled rule set 926. Finally, the agent 920 requests a new working memory 924 from the rule engine 922. The working memory will hold all of the data the agent chooses to assert before and during execution of the rule engine. At this point, the agent 920 is ready to execute the rule engine.

Figure 10:
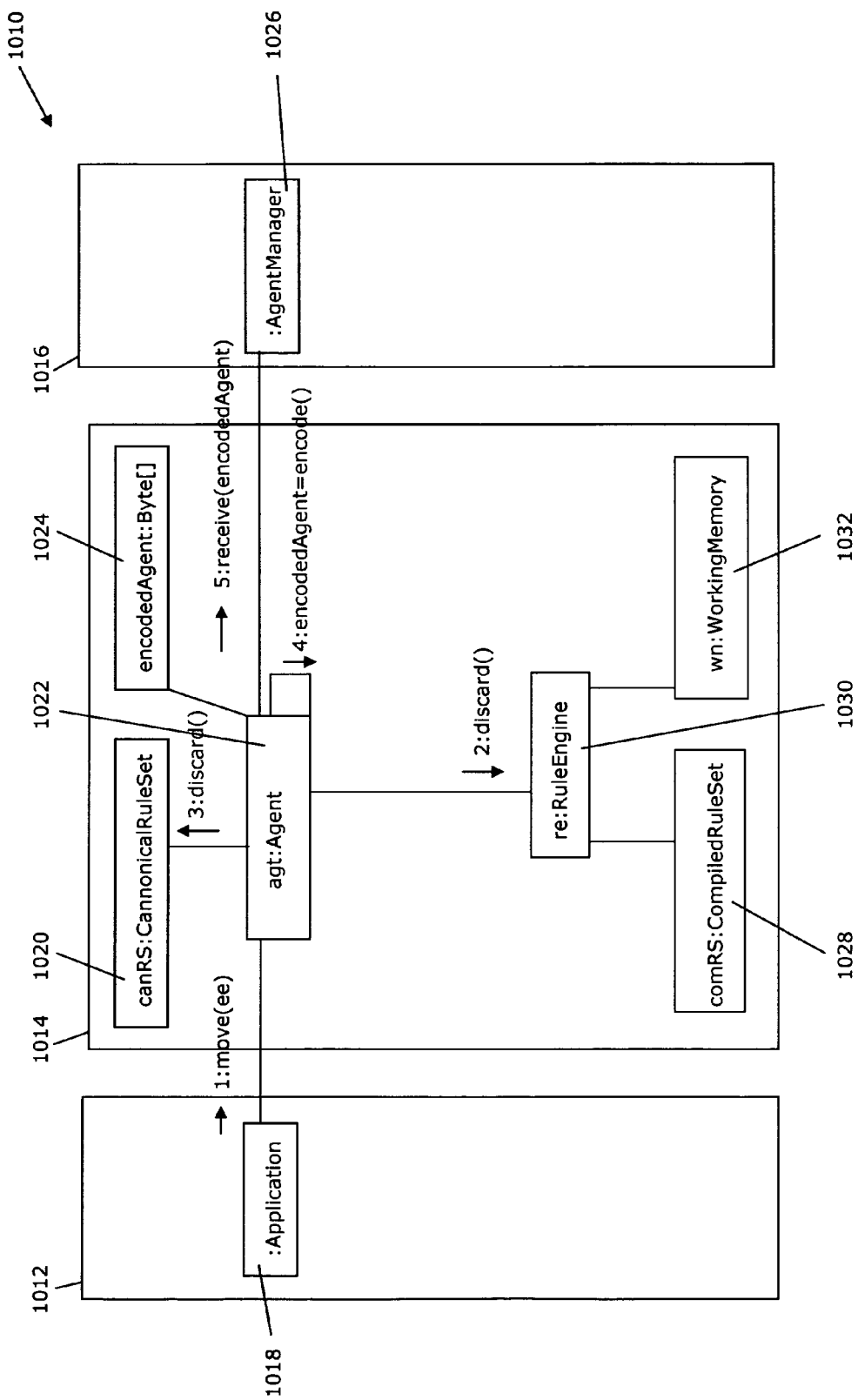
FIG. 10 is a diagram illustrating an exemplary process of moving an agent carrying compiled rules from a first execution environment.
Figure 11:
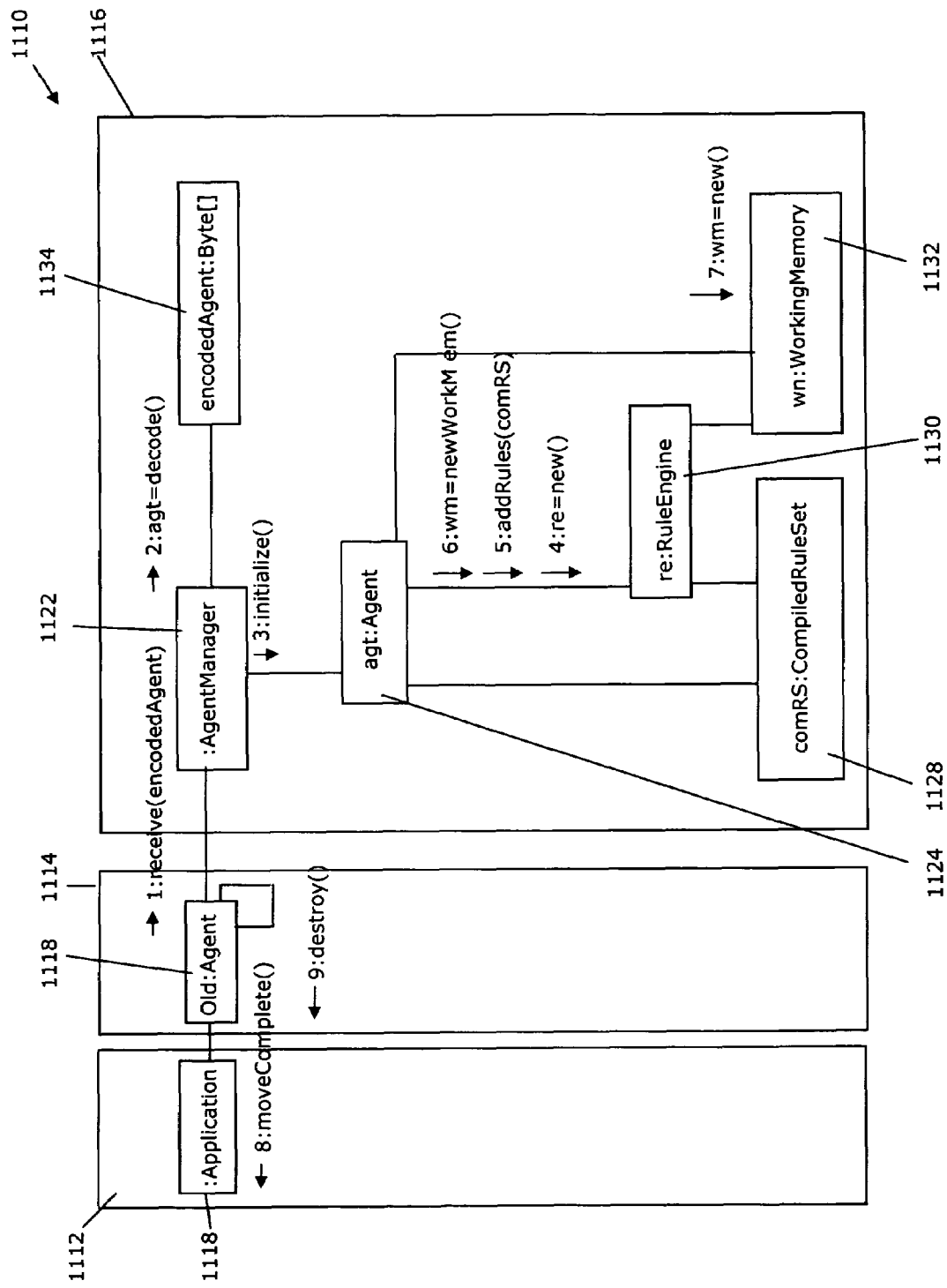
FIG. 11 is a diagram illustrating an exemplary process of moving an agent carrying compiled rules to a second execution environment.

Referring now to FIGS. 10-11, diagrams illustrating an exemplary process of moving an agent carrying compiled rules from one execution environment to another are shown. An application 1018 in execution environment 1012 request that an agent 1022 in execution environment 1014 move to execution environment 1016. The location of execution environment 1016 may be described in the move request by an IP address and port, Uniform Resource Locator (URL), or any other means of addressing. The agent 1022 discards its rule engine 1030 along with the associated working memory 1032. Subsequently, the agent 1022 discards its canonical rule set 1020 if it still has a reference to it. The agent 1022 then encodes itself along with its compiled rule set 1028 into a transferable form 1024. Though a byte array is shown, the encoded agent could take any form that can be transferred between the two execution environments. Once the agent 1022 has created an encoded version of itself 1024 in execution environment 1014 it transfers the encoded version 1024 to an agent manager 1026 residing in execution environment 1016.

Referring now to FIG. 11, the process continues with an agent manager 1122 receiving an encoded agent 1134. Upon receipt of the encoded agent 1134, the agent manager 1122 decodes the encoded agent 1134 into a new version of the agent 1124 and its compiled rule set 1128 in execution environment 1116. Once the agent 1124 and rule set 1128 have been decoded, the agent manager 1122 requests that the agent 1124 initialize. This request prompts the agent 1124 to create a new rule engine 1130 and subsequently pass the compiled rule set 1128 to it. As during construction, if the execution environment has a rule engine, then one may not need to be created. Once the engine 1130 has been located/created and the compiled rule set 1128 has been added to it, the agent 1124 requests a new working memory 1132 from the rule engine. As before, the working memory will hold all of the data the agent chooses to assert before and during execution of the rule engine. At this point, the agent 1124 is ready to execute the rule engine. Once the move operation completes, the old version of the agent 1118 in execution environment 1114 indicates to the requesting application 1118 in execution environment 1112 that the move operation has completed. Once the notification has been made, the old agent 1118 is destroyed.

Execution Environment Rule Set Usage

Each execution environment may have access to a local rule repository which allow for the rules for a particular domain, domain rules, to be distributed, or partitioned, in any number of rule repositories. An agent may be configured to only use rules provided at construction essentially ignoring rules available from each execution environment's local rule repository. The more general case is for the agent to make use of the rules that it carries with itself along with the rules extracted from the execution environment's local rule repository. Local rule repositories may contain rules for several different domains and are usually specific to execution environment objects that will be asserted to working memory but may also apply to execution environment concerns such as security, resource usage, scheduling, or any other execution environment attribute.

Figure 12:
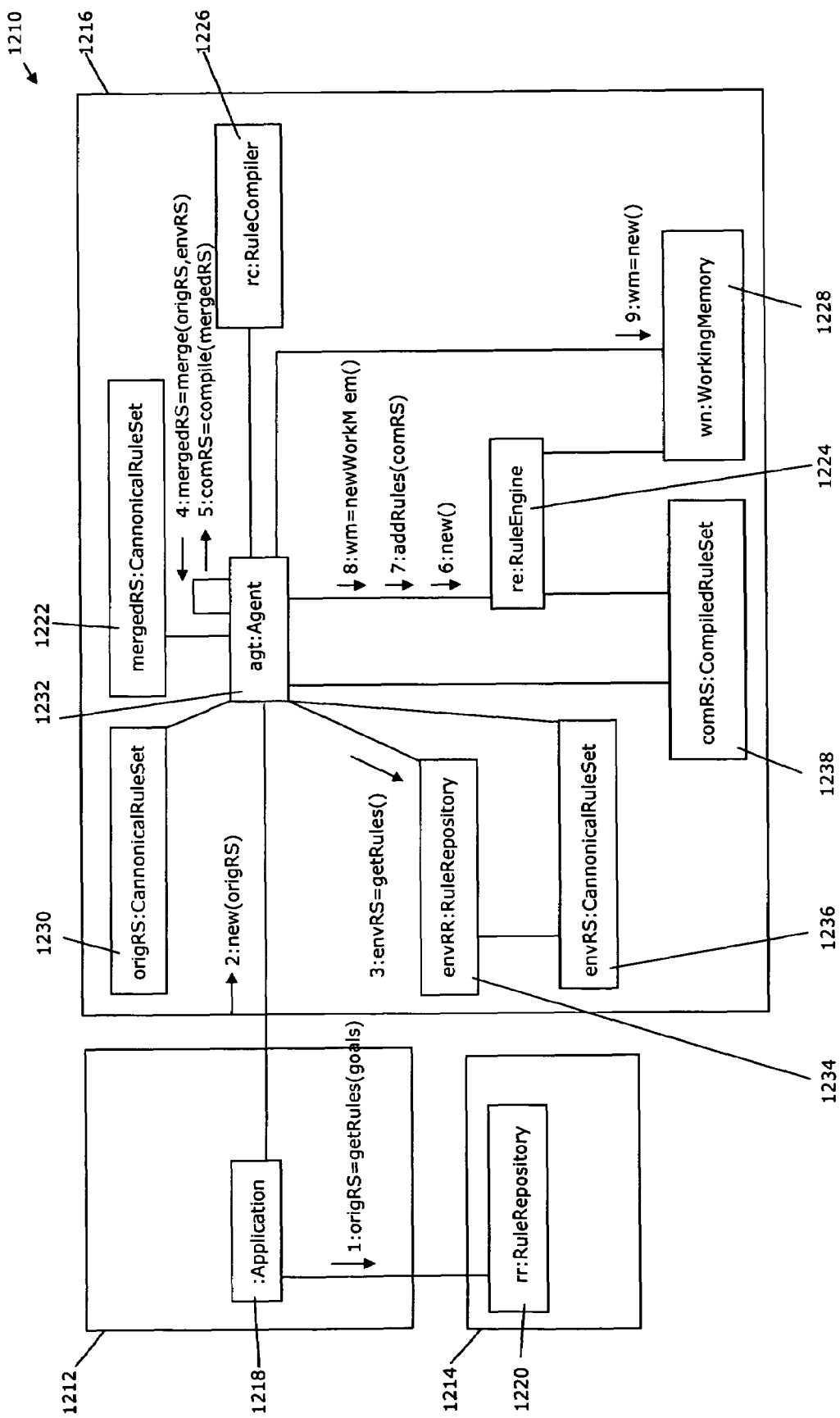
FIG. 12 is a diagram illustrating an exemplary process of constructing an agent remotely with a set of canonical rules carried by the agent and a set of canonical execution environment rules resident in a remote environment.

Referring now to FIG. 12, a diagram illustrating an exemplary process of constructing an agent remotely with a set of canonical rules carried by the agent and a set of canonical rules resident in a remote environment is shown. An application 1218, in execution environment 1212, requests a set of rules for an agent from a rule repository 1220 in execution environment 1214 based on the goals of the agent that is being created. The result is a collection of canonical rules, known as a rule set 1230. The rule set 1230 is passed to the agent 1232 during construction in execution environment 1216. During construction, the agent 1232 requests the set of rules from a local rule repository 1234 given the agent's domain (not shown). The result of which, canonical rule set 1236, is then merged with the construction supplied rule set 1230 to form a merged rule set 1222. This rule set contains all the domain and environment specific rules that the agents' rule engine will execute. The agent 1232 then takes the merged rule set 1222 and requests that it be compiled by the local rule compiler 1226. This results in the creation of a compiled rule set 1238. At this point the agent creates a rule engine 1224 that will be used to execute the rule set 1238. Note that if execution environment 1216 includes a rule engine, then one may not need to be created. After the rule engine 1224 is created or located, the agent 1232 supplies the engine 1224 with the compiled rule set 1238. Finally, the agent 1232 requests a new working memory 1228 from the rule engine 1224. The working memory will hold all of the data the agent chooses to assert before and during execution of the rule engine.

Figure 13:
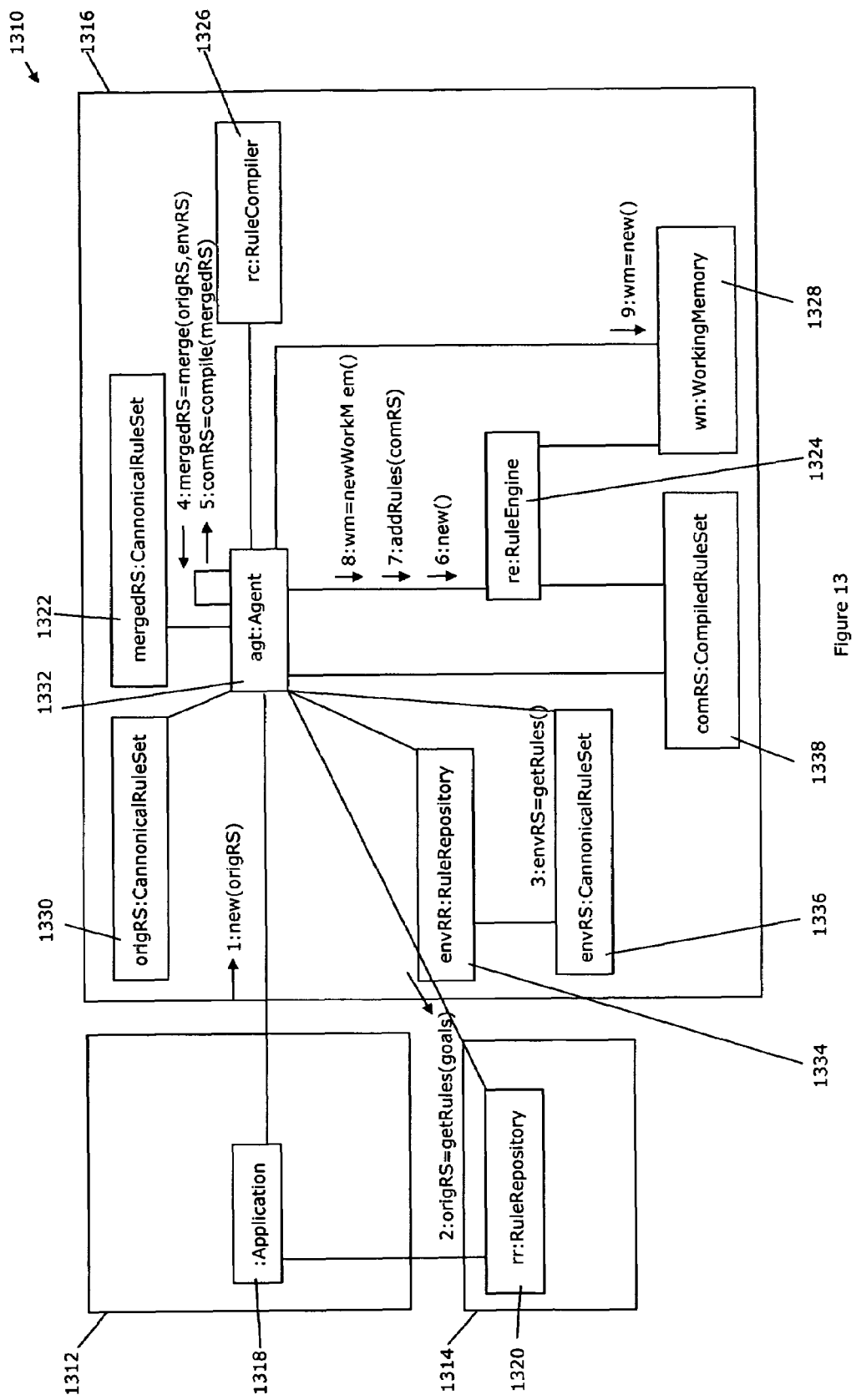
FIG. 13 is a diagram illustrating an exemplary process of constructing an agent remotely with a set of canonical rules fetched by the agent and a set of canonical execution environment rules resident in a remote environment.

Referring now to FIG. 13, a diagram illustrating an exemplary process of constructing an agent remotely with a set of canonical rules fetched by the agent and a set of canonical local rules resident in a remote environment is shown. An application 1318, in execution environment 1312, requests the creation of an agent 1332 in execution environment 1316. Agent 1332 is passed the location of a rule repository 1320 during construction. During construction, the agent 1332 requests a set of rules based on its goals from the rule repository 1320 in execution environment 1314. The result is a collection of canonical rules, known as a rule set 1330. During construction, the agent 1332 requests the set of rules from a local rule repository 1334 that apply to its domain. The result of which, canonical rule set 1336, is then merged with the fetched rule set 104 to form a merged rule set 1322. This rule set contains all the domain and environment specific rules that the agents' rule engine will execute. The agent 1332 then takes the merged rule set 1322 and requests that it be compiled by the local rule compiler 1326. This results in the creation of a compiled rule set 1338. At this point the agent creates a rule engine 1324 that will be used to execute the rule set 1338. Note that if execution environment 1316 includes a rule engine, then one may not need to be created. After the rule engine 1324 is created or located, the agent 1332 supplies the engine 1324 with the compiled rule set 1338. Finally, the agent 1332 requests a new working memory 1328 from the rule engine 1324. The working memory will hold all of the data the agent chooses to assert before and during execution of the rule engine.

Figure 14:
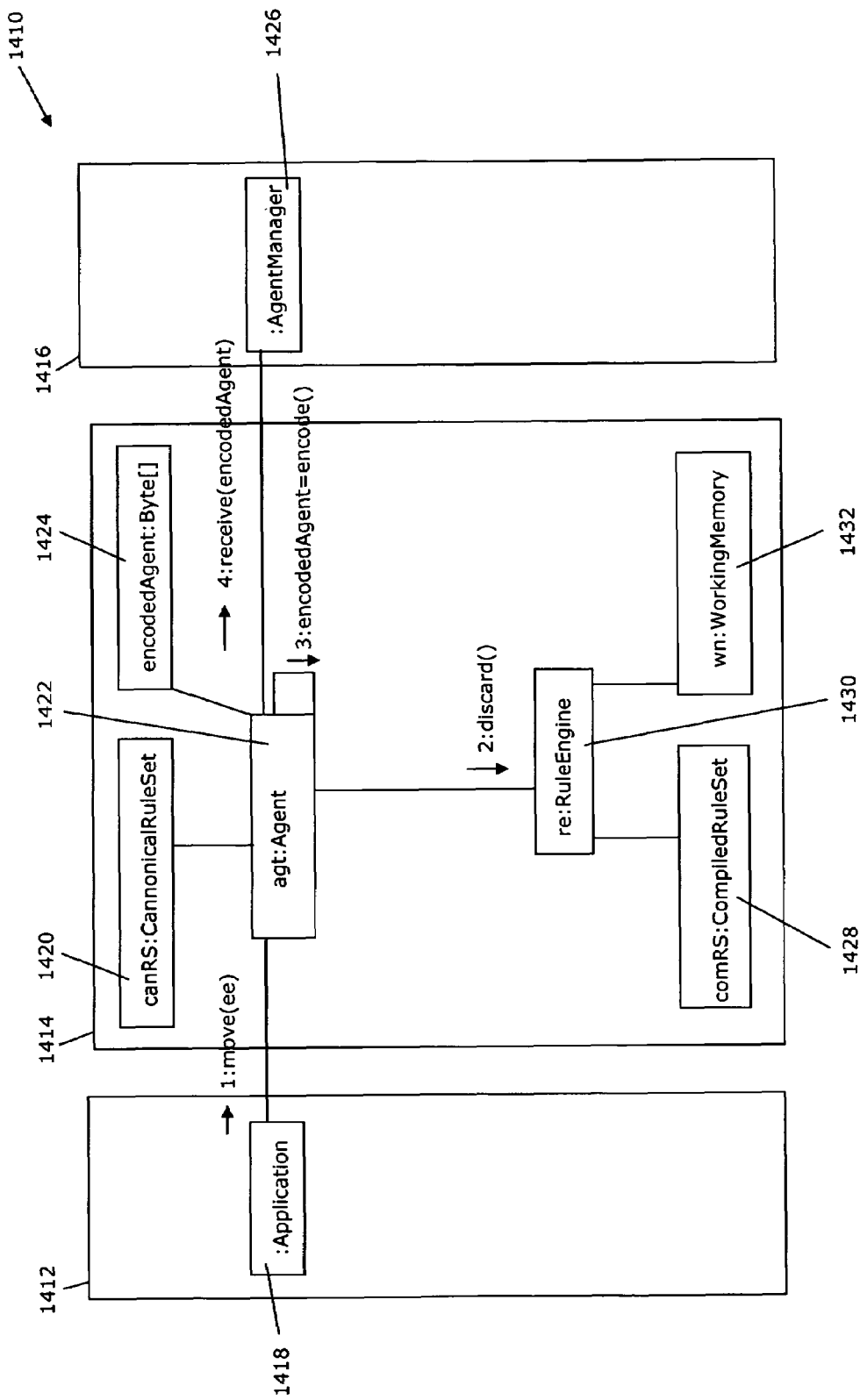
FIG. 14 is a diagram illustrating an exemplary process of moving an agent carrying canonical rules from a first execution environment that includes execution environment rules.
Figure 15:
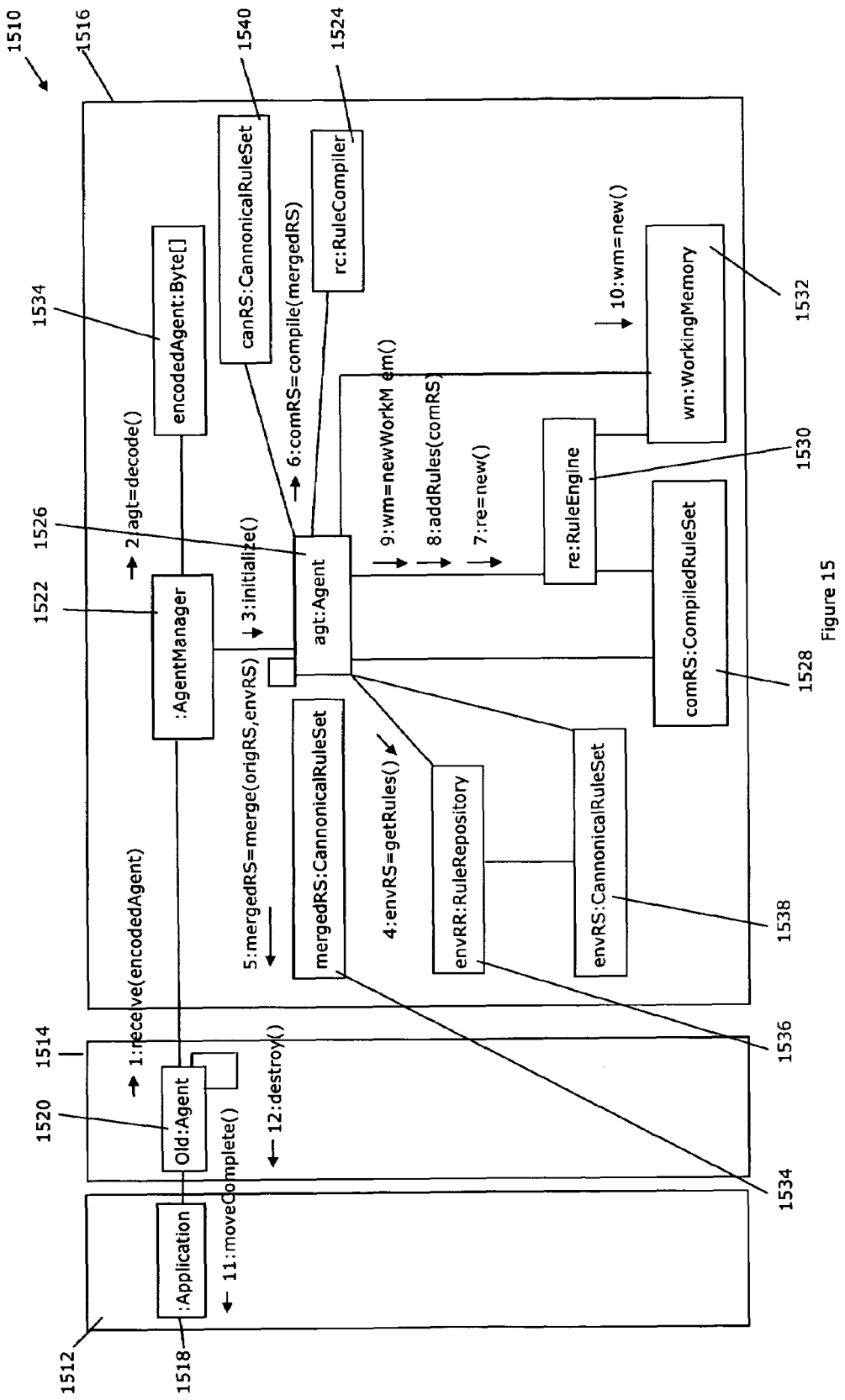
FIG. 15 is a diagram illustrating an exemplary process of moving an agent carrying canonical rules to a second execution environment that includes a repository of canonical execution environment rules.

Referring now to FIGS. 14-15, diagrams illustrating an exemplary process of moving an agent carrying canonical rules to an execution environment that includes a local repository of canonical rules are shown. Referring now to FIG. 14, an application 1418 in execution environment 1412 requests that an agent 1422 in execution environment 1414 move to execution environment 1416. The location of execution environment 1416 may be described in the move request by an IP address and port, Uniform Resource Locator (URL), or any other means of addressing. The agent 1422 discards its rule engine 1430 along with the associated compiled rule set 1428 and working memory 1432. The agent 1422 then encodes itself along with its canonical rule set 1420 into a transferable form 1424. Though a byte array is shown, the encoded agent could take any form that can be transferred between the two execution environments. Once the agent 1422 has created an encoded version of itself 1424 in execution environment 1414 it transfers the encoded version 1424 to an agent manager 1426 residing in execution environment 1416.

Referring now to FIG. 15, the process continues with the agent manager 1522 receiving the encoded agent 1534. Upon receipt of the encoded agent 1534, the agent manager 1522 decodes the encoded agent 1534 into a new agent 1526 and its canonical rule set 1540 in execution environment 1516. Once the agent 1526 and rule set 1540 have been decoded, the agent manager 1522 requests that the agent 1526 initialize. This request prompts the agent 1526 to request the set of rules applicable to the agent's domain from a local rule repository 1536. The result of which, canonical rule set 1538, is then merged with the carried rule set 1540 to form a merged rule set 1534. This rule set contains all the domain and environment specific rules that the agents rule engine will execute. The agent 1526 then takes the merged rule set 1534 and requests that it be compiled by the local rule compiler 1524. The result is a compiled rule set 1528. The agent then creates a new rule engine 1530 and subsequently passes the compiled rule set 1528 to it. As during construction, if the execution environment has a sharable rule engine, then one may not need to be created. Once the engine 1530 has been located/created and the compiled rule set 1528 has been added to it, the agent 1526 requests a new working memory 1532 from the rule engine. As before, the working memory will hold all of the data the agent chooses to assert before and during execution of the rule engine. Once the move operation completes, the old version of the agent 1520 in execution environment 1514 indicates to the requesting application 1518 in execution environment 1512 that the move operation has completed. Once the notification has been made, the old agent 1520 is destroyed.

As-Needed Rules

As there is a cost of carrying around unnecessary rules in terms of both CPU and memory usage, it is desirable in many cases to supply an agent with a subset of its total potential rule set. This can be done in a context-specific manner based on the goals and execution environment of the agent. For example, if each device upon which an agent will be executing only contains a small screen, then there is no need to carry the rules for display on a standard computer monitor. As another example, an agent who moves progressively further in a single direction, perhaps among GPS enabled fixed location devices, need not carry rules that only apply to previous GPS locations.

Figure 16:
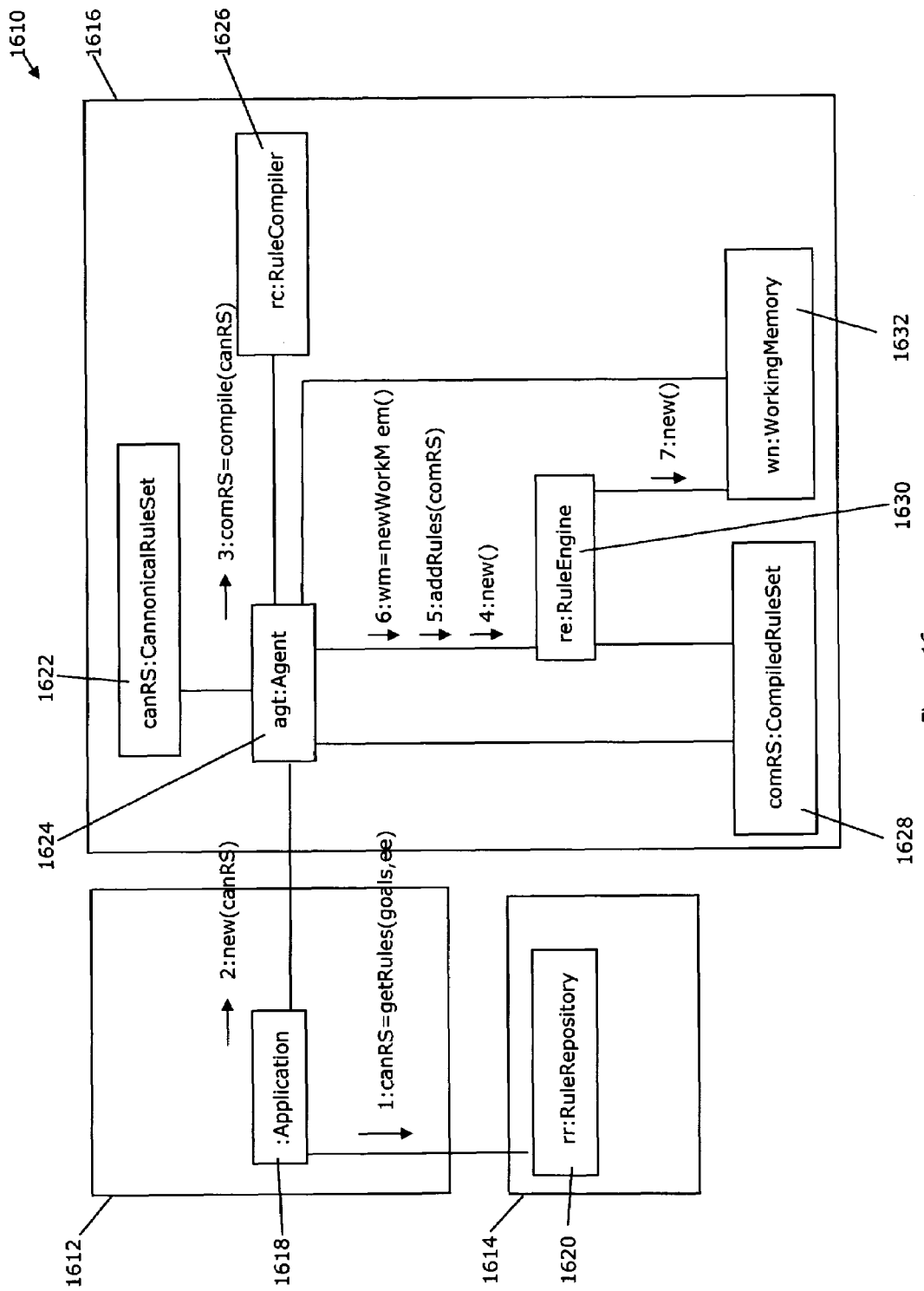
FIG. 16 is a diagram illustrating an exemplary process of constructing an agent at a remote location with an as-needed set of canonical rules supplied during construction.

Referring now to FIG. 16, a diagram illustrating an exemplary process of constructing an agent at a remote location with an as-needed set of canonical rules supplied during construction is shown. An application 1618, in execution environment 1612, requests a set of rules for an agent from a rule repository 1620 in execution environment 1614 based on the goals and initial execution environment of the agent that is being created. When supplied with a target execution environment, the rule repository 1620 can filter out rules that do not apply to that type of environment. The result is a collection of canonical rules, known as a rule set 1622. The rule set 1622 is passed to the agent 1624 during construction in execution environment 1616. The agent 1624 in execution environment 1616 takes the rule set 1622 and requests that it be compiled by the local rule compiler 1626. This results in the creation of a compiled rule set 1628. At this point the agent creates the rule engine 1630 that will be used to execute the rule set. Note that if execution environment 1616 includes a rule engine, then one may not need to be created. After the rule engine 1630 is created or located, the agent 1624 supplies the engine 1630 with the compiled rule set 1628. Finally, the agent 1624 requests a new working memory 1632 from the rule engine 1630. The working memory will hold all of the data the agent chooses to assert before and during execution of the rule engine. At this point, the agent 1624 is ready to be moved to another execution environment or to execute the rule engine.

Figure 17:
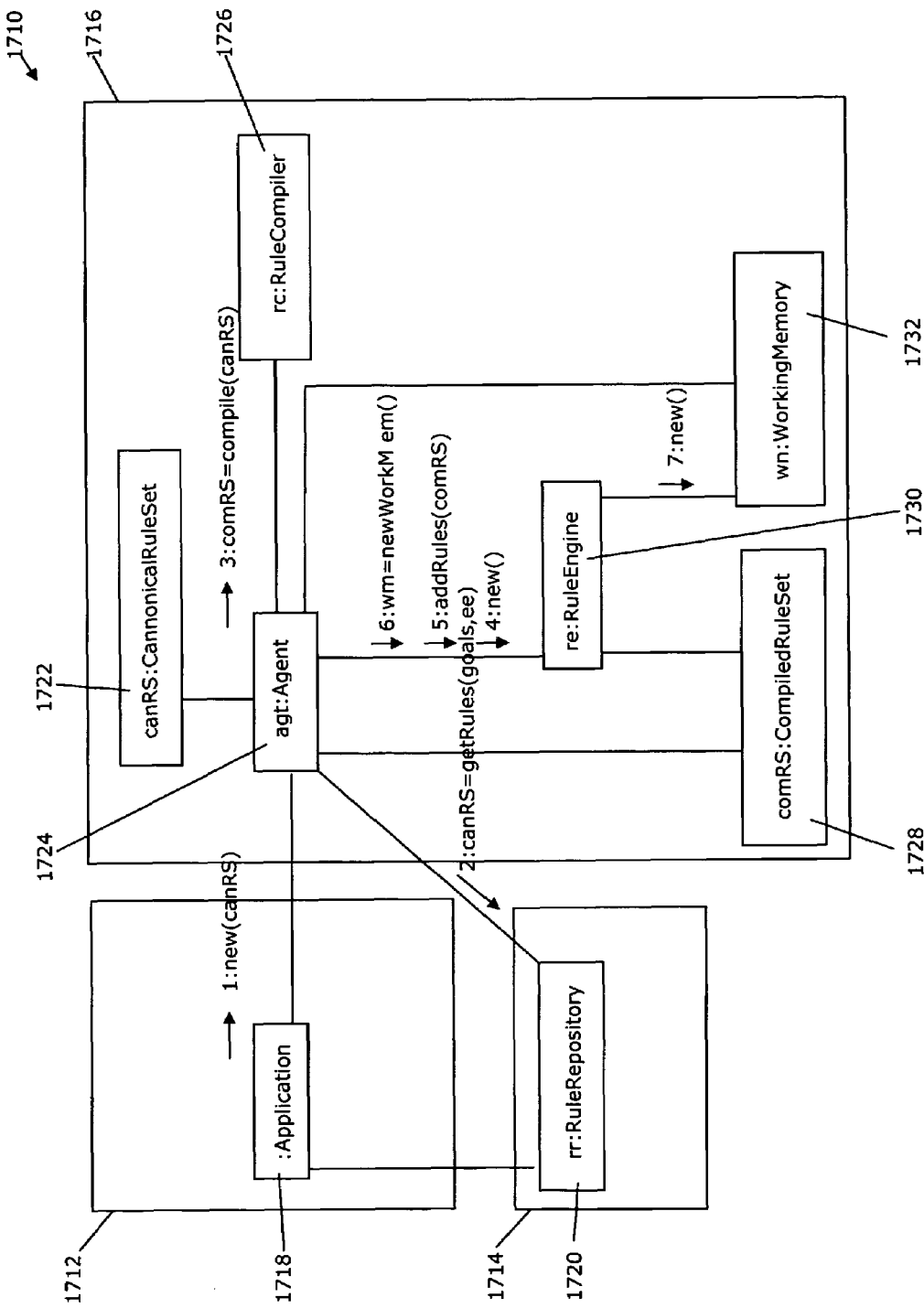
FIG. 17 is a diagram illustrating an exemplary process of constructing an agent at a remote location with an as-needed set of canonical rules fetched during construction.

Referring now to FIG. 17, a diagram illustrating an exemplary process of constructing an agent at a remote location with an as-needed set of canonical rules fetched during construction is shown. An application 1718, in execution environment 1712, requests the creation of an agent 1724 in execution environment 1716. Agent 1724 is passed the location of a rule repository 1720 during construction. During construction, the agent 1724 requests a set of rules based on its goals and execution environment from the rule repository 1720 in execution environment 1714. When supplied with the target execution environment, the rule repository 1720 can filter out rules that do not apply to that type of environment. The result is a collection of canonical rules, known as a rule set 1722. The agent 1724 in execution environment 204 takes the rule set 1722 and requests that it be compiled by the local rule compiler 1726. This results in the creation of a compiled rule set 1728. At this point the agent creates the rule engine 1730 that will be used to execute the rule set. Note that if execution environment 1714 includes a rule engine, then one may not need to be created. After the rule engine 1730 is created or located, the agent 1724 supplies the engine 1730 with the compiled rule set 1728. Finally, the agent 1724 requests a new working memory 1732 from the rule engine 1730. The working memory will hold all of the data the agent chooses to assert before and during execution of the rule engine. At this point, the agent 1724 is ready to be moved to another execution environment or to execute the rule engine.

Figure 18:
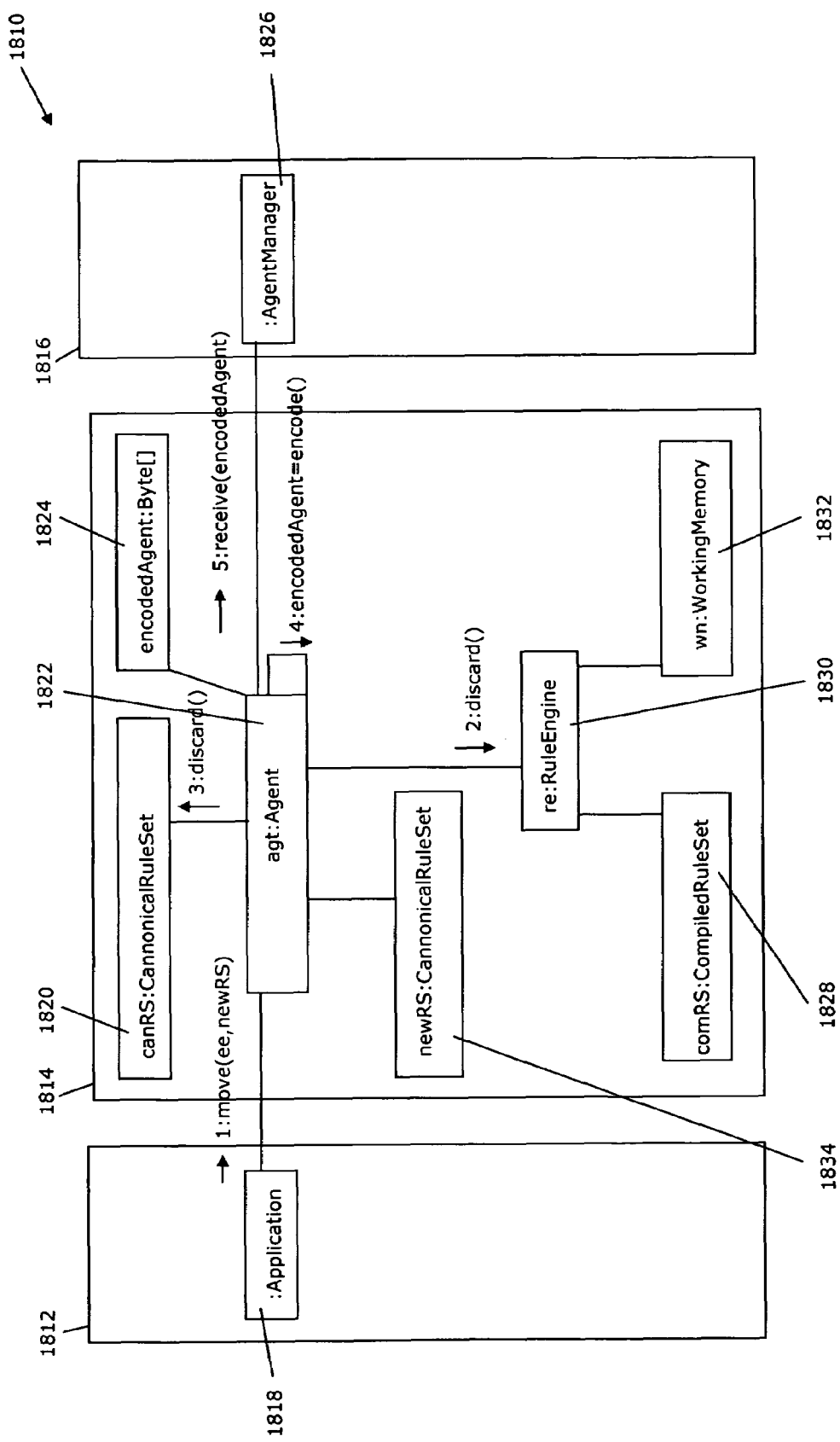
FIG. 18 is a diagram illustrating an exemplary process of moving an agent with supplied as-needed canonical rules from a first execution environment.
Figure 19:
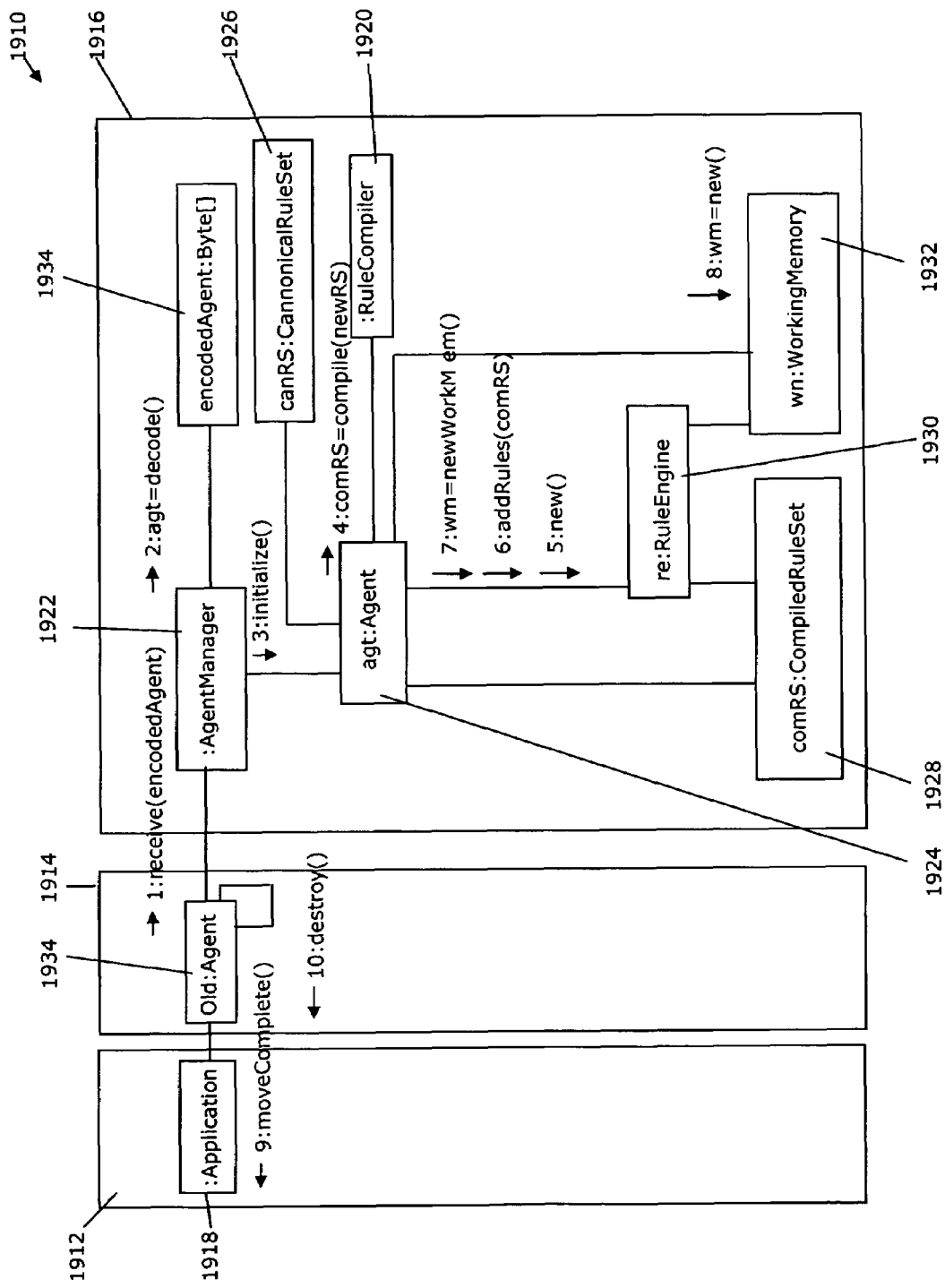
FIG. 19 is a diagram illustrating an exemplary process of moving an agent with supplied as-needed canonical rules to a second execution environment.

Referring now to FIGS. 18-19, diagrams illustrating an exemplary process of moving an agent from one execution environment to another with a supplied as-needed set of canonical rules are shown. An application 1818 in execution environment 1812 requests that an agent 1822 in execution environment 1814 move to execution environment 1816. The location of execution environment 1816 may be described in the move request by an IP address and port, Uniform Resource Locator (URL), or any other means of addressing. The move request includes a new as-needed canonical rule set 1834 based on the agent's goals and target execution environment. The agent 1822 discards its rule engine 1830 along with the associated compiled rule set 1828 and working memory 1832. In addition the agent 1822 discards its old canonical rule set 1820. At this point, the agent 1822 encodes itself along with its new as-needed canonical rule set 1834 into a transferable form 1824. Though a byte array is shown, the encoded agent could take any form that can be transferred between the two execution environments. Once the agent 1822 has created an encoded version of itself 1824 in execution environment 1814 it transfers the encoded version 1824 to an agent manager 1826 residing in execution environment 1816.

Referring now to FIG. 19, the process continues with the agent manager 1922 receiving an encoded agent 1934. Upon receipt of the encoded agent 1934, the agent manager 118 decodes the encoded agent 1934 into a new version of the agent 1924 and its new canonical rule set 1926 in execution environment 1916. Once the agent 1924 and rule set 1926 have been materialized, the agent manager 1922 requests that the agent 1922 initialize. This request prompts the agent 1922 to go to the execution environments' rule compiler 1920 and request compilation of its canonical rule set 1926. The result is a compiled rule set 1928. The agent then creates a new rule engine 1930 and subsequently passes the compiled rule set 1928 to it. As during construction, if the execution environment has a rule engine, then one may not need to be created. Once the engine 1928 has been located/created and the compiled rule set 1926 has been added to it, the agent 1922 requests a new working memory from the rule engine. As before, the working memory will hold all of the data the agent chooses to assert before and during execution of the rule engine. Once the move operation completes, the old version of the agent 1918 in execution environment 1914 indicates to the requesting application 1918 in execution environment 1912 that the move operation has completed. Once the notification has been made, the old agent 1934 is destroyed.

Figure 20:
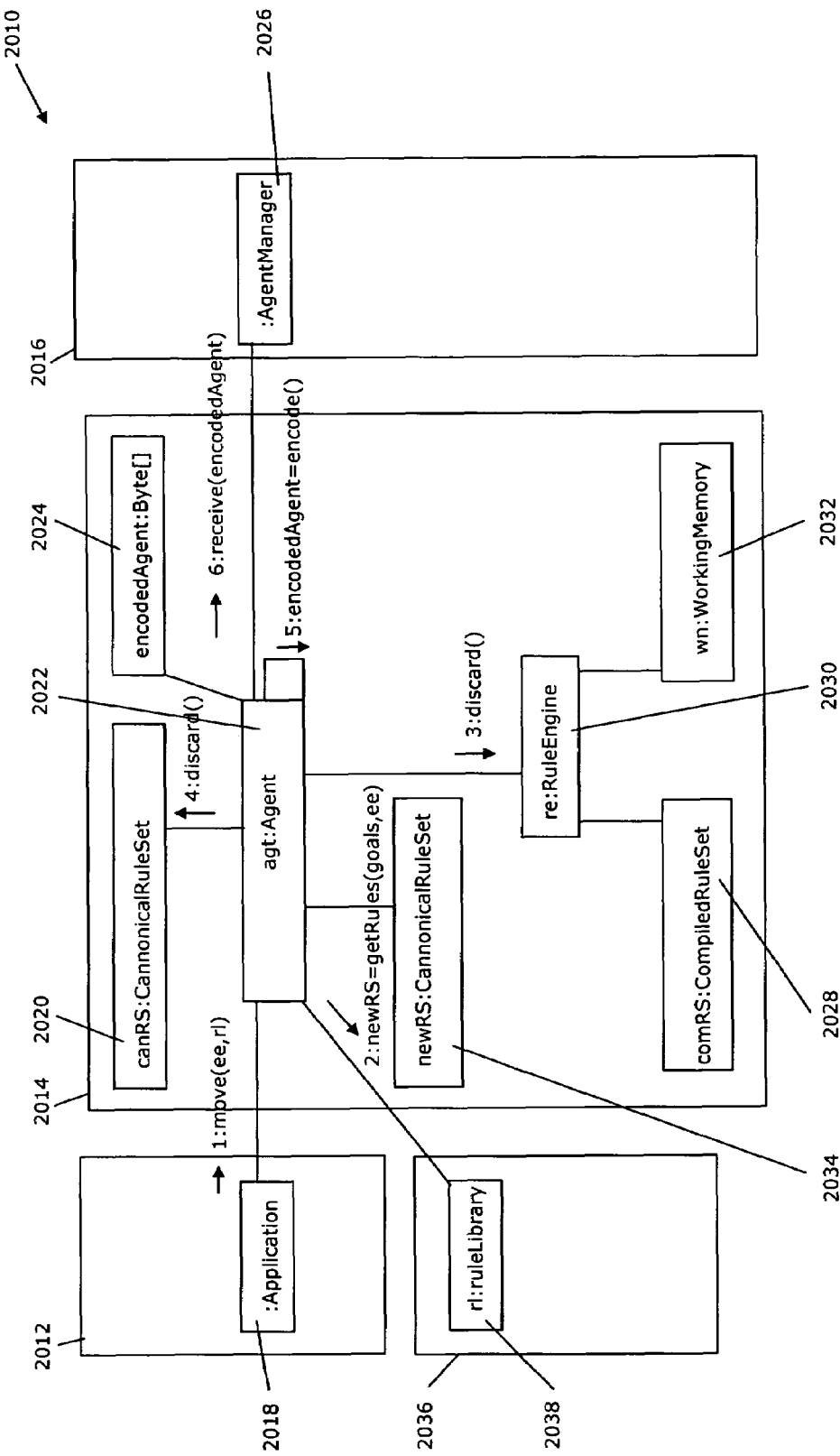
FIG. 20 is a diagram illustrating an exemplary process of moving an agent from a first execution environment with a fetched as-needed set of canonical rules.
Figure 21:
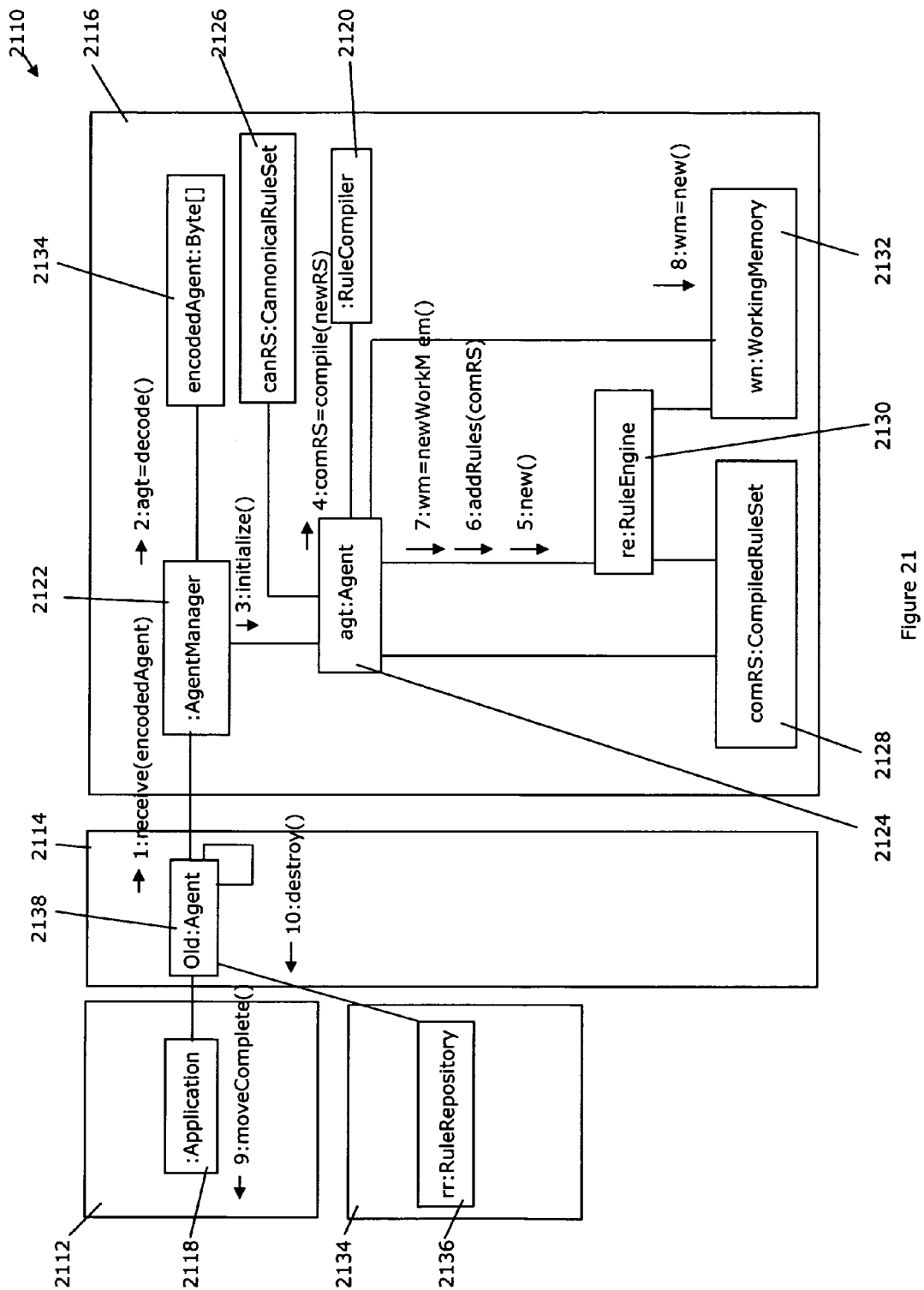
FIG. 21 is a diagram illustrating an exemplary process of moving an agent to a second execution environment with a fetched as-needed set of canonical rules.

Referring now to FIGS. 20-21, diagrams illustrating an exemplary process of moving an agent from one execution environment to another with a fetched as-needed set of canonical rules are shown. An application 2018 in execution environment 2012 requests that an agent 2022 in execution environment 2014 move to execution environment 2016. The location of execution environment 2016 may be described in the move request by an IP address and port, Uniform Resource Locator (URL), or any other means of addressing. The move request includes a reference to a rule repository 2038 from which the agent should fetch a new as-needed rule set. Upon receiving the move request, the agent 2022 requests a new as-needed rule set from the supplied rule repository 2038 based on its goals and target execution environment 2016. After receiving the new canonical rule set 2034, the agent 2022 discards its rule engine 2030 along with the associated compiled rule set 2028 and working memory 2032. In addition the agent 2022 discards its old canonical rule set 2020. At this point, the agent 2022 encodes itself along with its new as-needed canonical rule set 2034 into a transferable form 2024. Though a byte array is shown, the encoded agent could take any form that can be transferred between the two execution environments. Once the agent 2022 has created an encoded version of itself 2024 in execution environment 2014 it transfers the encoded version 2024 to an agent manager 2026 residing in execution environment 2016.

Referring now to FIG. 21, the process continues with the agent manager 2122 receiving an encoded agent 2134. Upon receipt of the encoded agent 2134, the agent manager 2122 decodes the encoded agent 2134 into a new version of the agent 2124 and its new canonical rule set 2126 in execution environment 204. Once the agent 2124 and rule set 124 have been materialized, the agent manager 2122 requests that the agent 2124 initialize. This request prompts the agent 2124 to go to the execution environment's rule compiler 2120 and request compilation of its canonical rule set 2126. The result is a compiled rule set 2128. The agent then creates a new rule engine 130 and subsequently passes the compiled rule set 2128 to it. As during construction, if the execution environment has a sharable rule engine, then one may not need to be created. Once the engine 2130 has been located/created and the compiled rule set 2126 has been added to it, the agent 2124 requests a new working memory from the rule engine. As before, the working memory will hold all of the data the agent chooses to assert before and during execution of the rule engine. Once the move operation completes, the old version of the agent 2138 in execution environment 2114 indicates to the requesting application 2118 in execution environment 2112 that the move operation has completed. Once the notification has been made, the old agent 2138 is destroyed.

Dynamic Determination of Needed Rules

Large rule sets, even with efficient algorithms such as Rete, are often expensive in computation and bandwidth. The process of dynamically removing rules considered unlikely to be useful has a benefit to performance and also, combined with mobile agents, provides an efficient method for utilizing large rule sets that can be partitioned across many repositories. This method also allows an agent to dynamically change the rules to meet the execution environment processing task.

Each constructed agent has a unique identifier for itself and this identifier is also known to the agent's originator. At the point of origination, this identifier will be associated with the agent's outcome. An example outcome is successfully attaining an end goal and sending the results back to the application. Another example outcome is the loss or death of the agent. An agent that is determined to be lost or dead may cause a replacement agent to be launched. The replacement agent will have a unique identifier that differs from the original agent. In addition to a unique agent identifier, an agent also carries with it an indicative subset of the set of previously completed agent outcomes for the given domain. This is a set of unique identifiers and outcomes for agents that have previously executed in the domain of the current agent.

In each execution environment, the local rule repository not only stores rules, but is also the location for agents to record statistics about rule engine activity for the rules in the rule set given to the rule engine. These instrumented rules include agent carried rules and rules for the domain that were retrieved from the local rule repository. Alternately, only the locally acquired domain rules may be instrumented.

Figure 22:
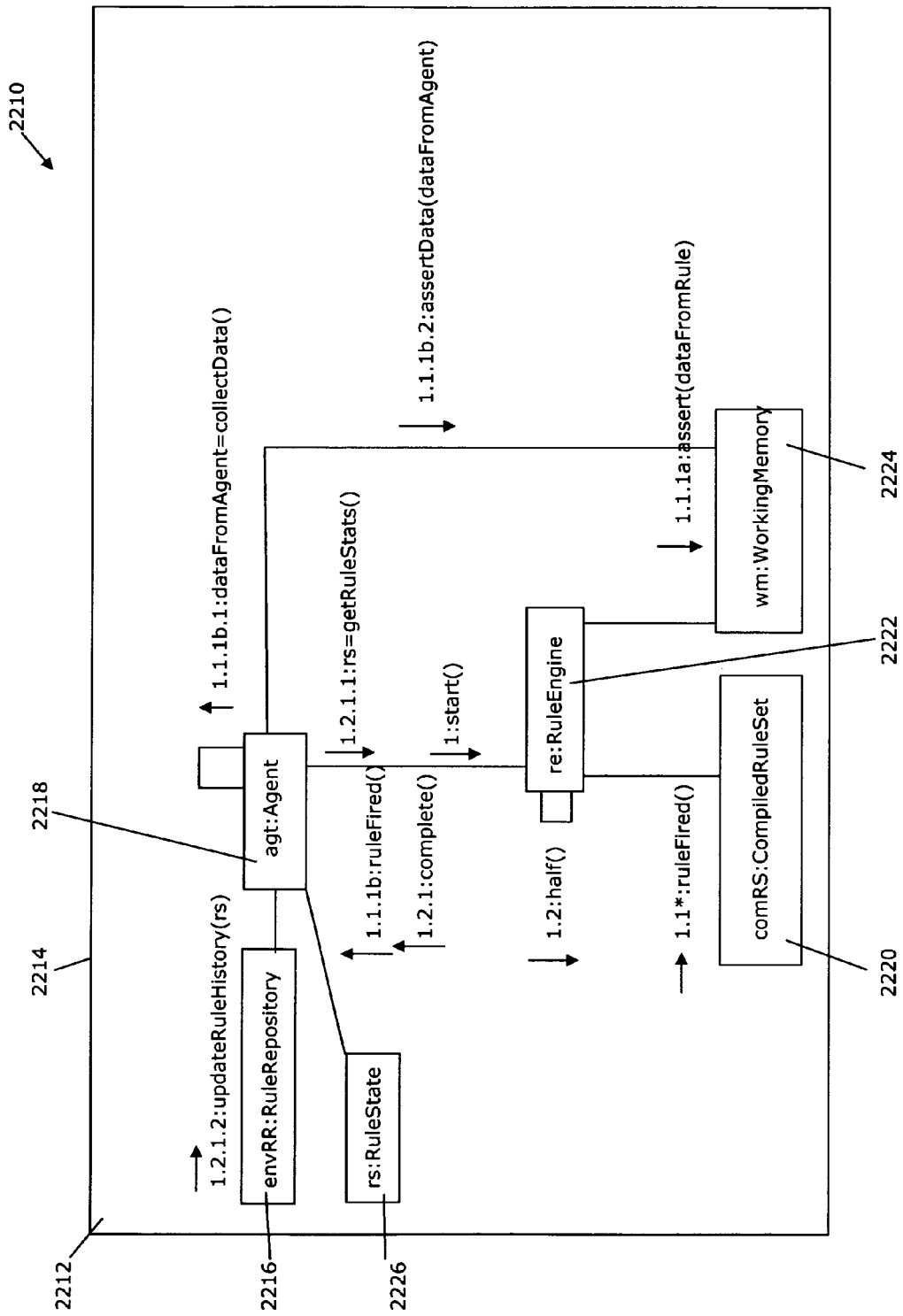
FIG. 22 is a diagram illustrating an exemplary process of a rule-based agent updating rule history when rule processing is halted in an execution environment.

Referring now to FIG. 22, a diagram illustrating an exemplary process of a rule-based agent updating rule statistics when rule processing has completed in an execution environment is shown. As before, an agent 2218 starts its associated rule engine 2222 to process its compiled rule set 2220. During the course of execution, the rule engine 2222 may successfully match part of the condition (left hand side) of a rule, may match the condition of a rule and activate it, or may match and activate and fire a rule (perform the consequences of the rule). A rule engine may provide for collection of the statistics for the phases of rule activity mentioned. Alternately, the agent may integrate listener code to monitor these phases of rule execution and collect the statistics as the rule engine executes. A rule being fired may result in the rule asserting new data into the working memory 2224 and/or the agent 2218 collecting more data and asserting that into the working memory 2224. Once an end goal terminates rule processing, or the agent receives a move event, a termination event, a timeout or some other event, then the rule engine is halted. At this point, the agent 2218 requests rule statistics from the rule engine 2222 or collects the statistics from the agent's rule engine listener. These statistics may include, but are not limited to the number of times a rule was fired, the number of times a rule was activated, the number of times a goal in the condition of a rule was matched, the number of times a part of the condition of a rule was matched, or any combination of the above. The statistics 2226 are then added to aggregate rule history stored in the local rule repository 2216. These stored statistics may include statistics for rules that are not available in the local rule repository since an agent can carry rules with it as it moves.

Figure 23:
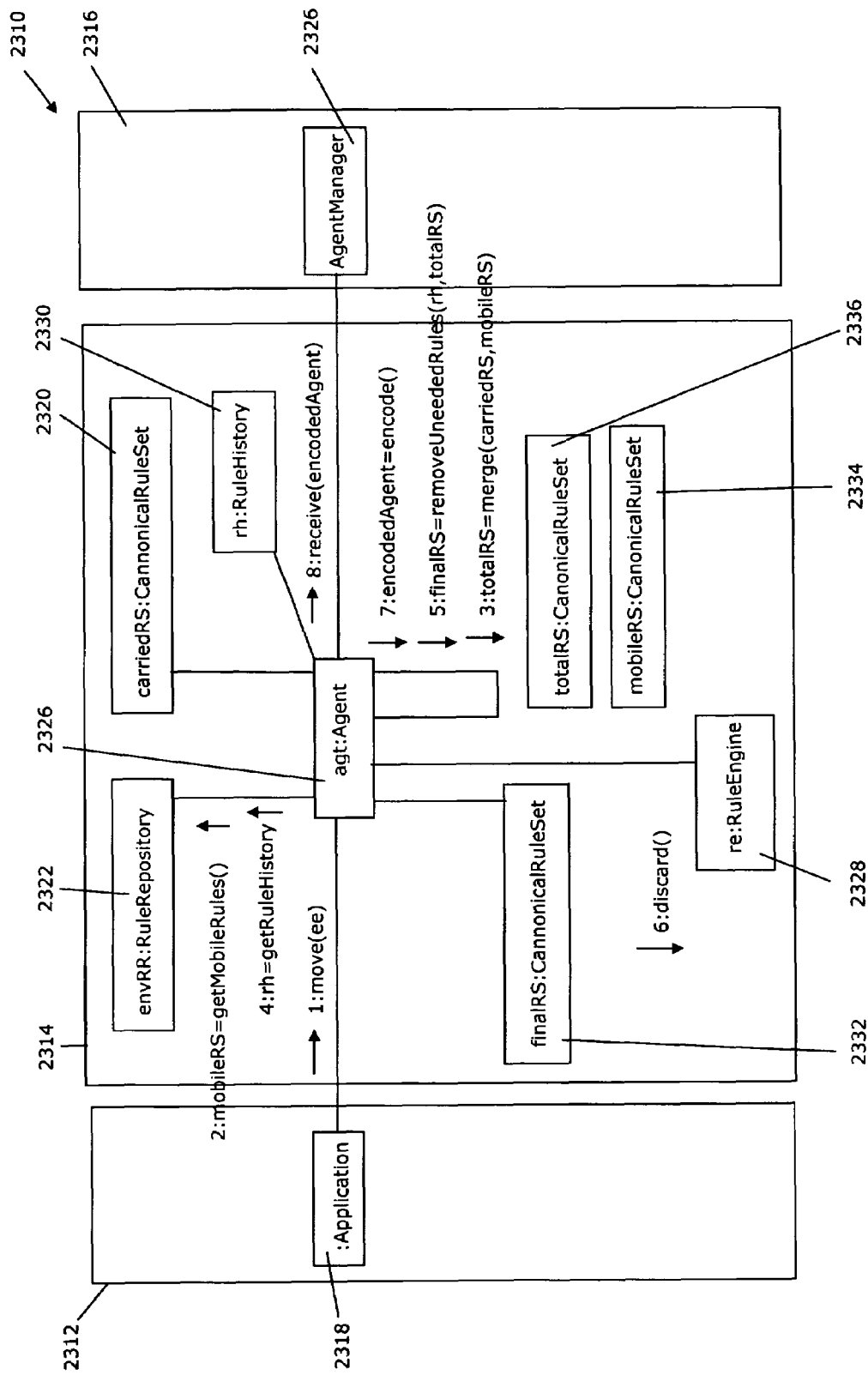
FIG. 23 is a diagram illustrating an exemplary process of a rule-based agent identifying and carrying only needed canonical rules during as part of movement to another execution environment.

When the agent prepares to move to another execution environment it dynamically determines to remove unnecessary rules by consulting the rule history associated with some or all of the rules in its current rule set in conjunction with the indicative subset of previously completed agent outcomes that the agent carries. Referring now to FIG. 23, a diagram illustrating an exemplary process of a rule-based agent dynamically removing unnecessary rules as part of movement to another execution environment is shown. An application 2318 requests that an agent 2326 in execution environment 2314 move to execution environment 2316. The agent 2326 requests a set of rules from the local rule repository 2322 that are allowed to be carried to other platforms. The result is a canonical rule set 2334. This rule set is then merged with the set of rules 2320 that the agent 2326 carried with it to execution environment 2314. The result is canonical rule set 2336.

At this point the agent consults the local rule repository 2322 to get the rule history 2330 of the rules in set 2336. The agent 2326 then uses the rule history 2330 with its carried set of previous agent outcomes to remove rules from rule set 116 that are unlikely to participate in a desired outcome. The statistics are used in aggregate form. As an example consider an agent that carries the results of 2318 previously executed agents and their outcomes, 50 of which were desirable outcomes. The agent examines the metrics for a particular rule named "A" which shows that it was never activated. The agent then removes rule "A" from its agent carried rule set. As another example consider rule "B" which has been activated and fired in one-third of previous desirable outcomes but also has been active and fired in nearly all negative outcomes. Rule "B" remains in the agent carried rule set. Finally, a rule, "C", which never activates for any as yet recorded desired outcomes but has been active in almost all negative outcomes can be considered a computational burden and removed from the agent carried rule set. Although activation is a criterion above, finer grained partial left-hand side matching statistics can be used as well. Since rule removal requires an aggregate of previous runs a threshold is provided so that no rule deletion is permitted until a requisite number of outcomes has been obtained.

Once the pruned rule set 2332 has been created, the agent 2326 encodes itself along with its pruned rule set 2332 into a transferable form in execution environment 2314. The agent 2326 then transfers the encoded version of itself in execution environment 2314 to an agent manager 2346 resident in the target execution environment 2316. The remainder of the move process follows that of FIG. 5.

Survivability Rules

All agents have a lifespan; but that lifespan need not be pre-determined if a set of rules around survivability of an agent is put in place. These rules may be agent specific or execution environment specific. They may be carried with the agent or resident in a rule repository for the execution environment. As these rules are like any other declarative rules, they may be any combination of the above according to the teachings of this invention. In addition, these rules may be used in conjunction with more typical survivability mechanisms such as heartbeats between the application and the agent.

Figure 24:
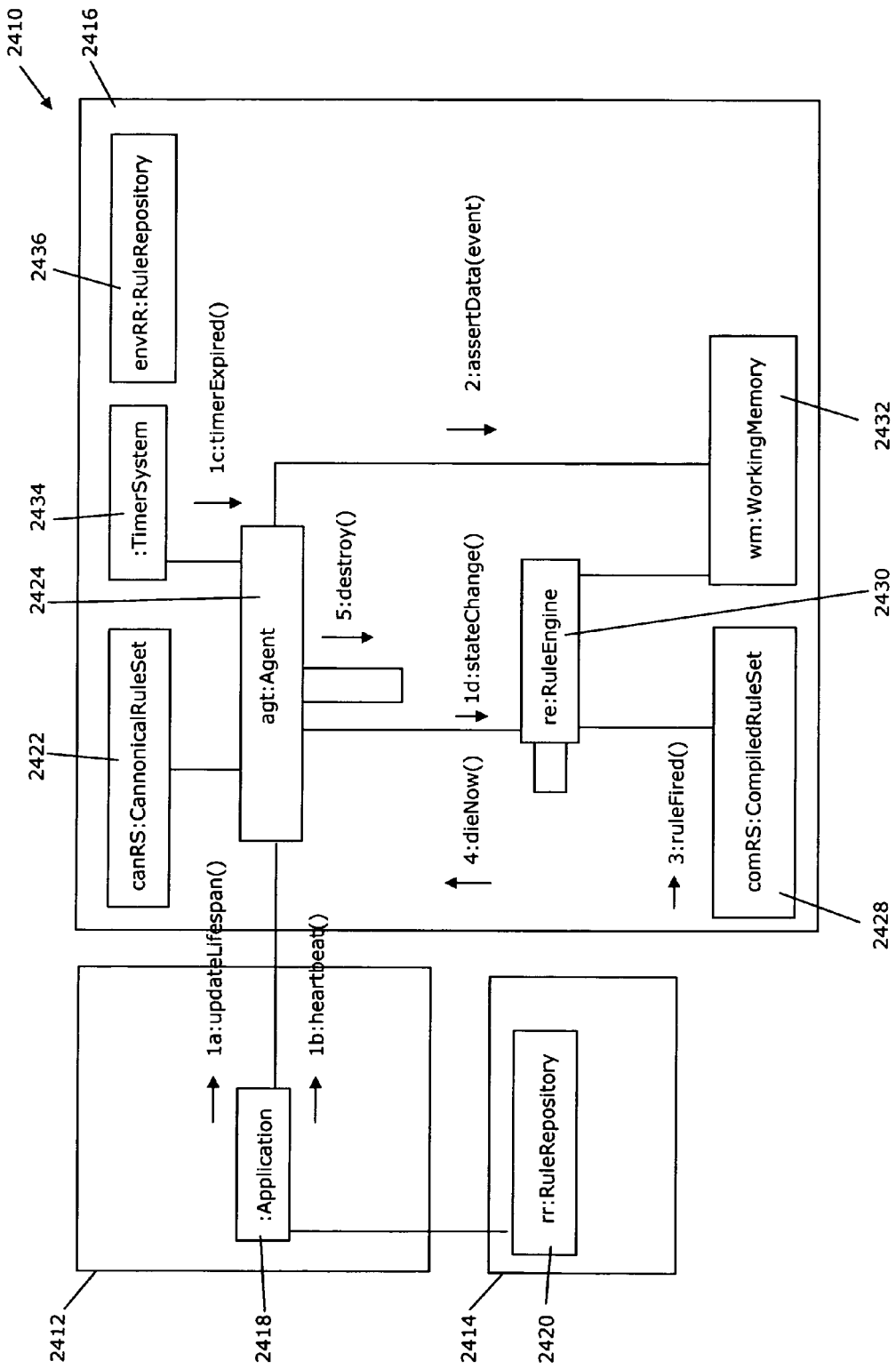
FIG. 24 is a diagram illustrating an exemplary process of an agent using a set of survival rules to determine its lifespan.

Referring now to FIG. 24, a diagram illustrating an exemplary process of an agent using a set of survival rules to determine its lifespan is shown. Agent survivability is controlled by the rules loaded in the local compiled rule set 2428. As before, the local rule set may be comprised of rules supplied or fetched from rule repository 2420 during construction, rules carried from other visited execution environments and/or execution environment specific rules retrieved from rule repository 2426. Many sources of data that may be asserted into the working memory and, combined with the local rule set 2428, affect the agent's 2424 lifespan. Examples include lifespan update events from application 2418, heartbeat events from application 2418, timer events from the execution environment's timer system 2434, and even state change events from the agent 2424 itself. As data is asserted into the working memory, the rules engine guarantees that applicable rules are fired. Any number of rules might result in the agent 2424 taking actions that affect its survivability. This includes death of the agent 2424 which is shown. When an agent 104 dies it halts rule engine processing, records any collected historical statistics for the local rule set and stores these in the rule repository 2436.

Data Narrowing Rules

Agent may visit many execution environments each with differing levels of network connectivity or an execution environment with multiple levels/types of network connectivity. Given this, it is important that an agent take this into consideration when responding to application requests, sending periodic reports, and determining how much data to carry with it when moving. As per the teachings of this invention, execution environment specific rules are an ideal method for insuring the appropriate agent behavior. If the networking capabilities of the execution environment are static, then rules for this may be maintained in the rule repository on the execution environment running the application that launched the agent. In many cases though, the capabilities may be more dynamic in which case the rules regarding network bandwidth are better kept on the remote execution environment.

Figure 25:
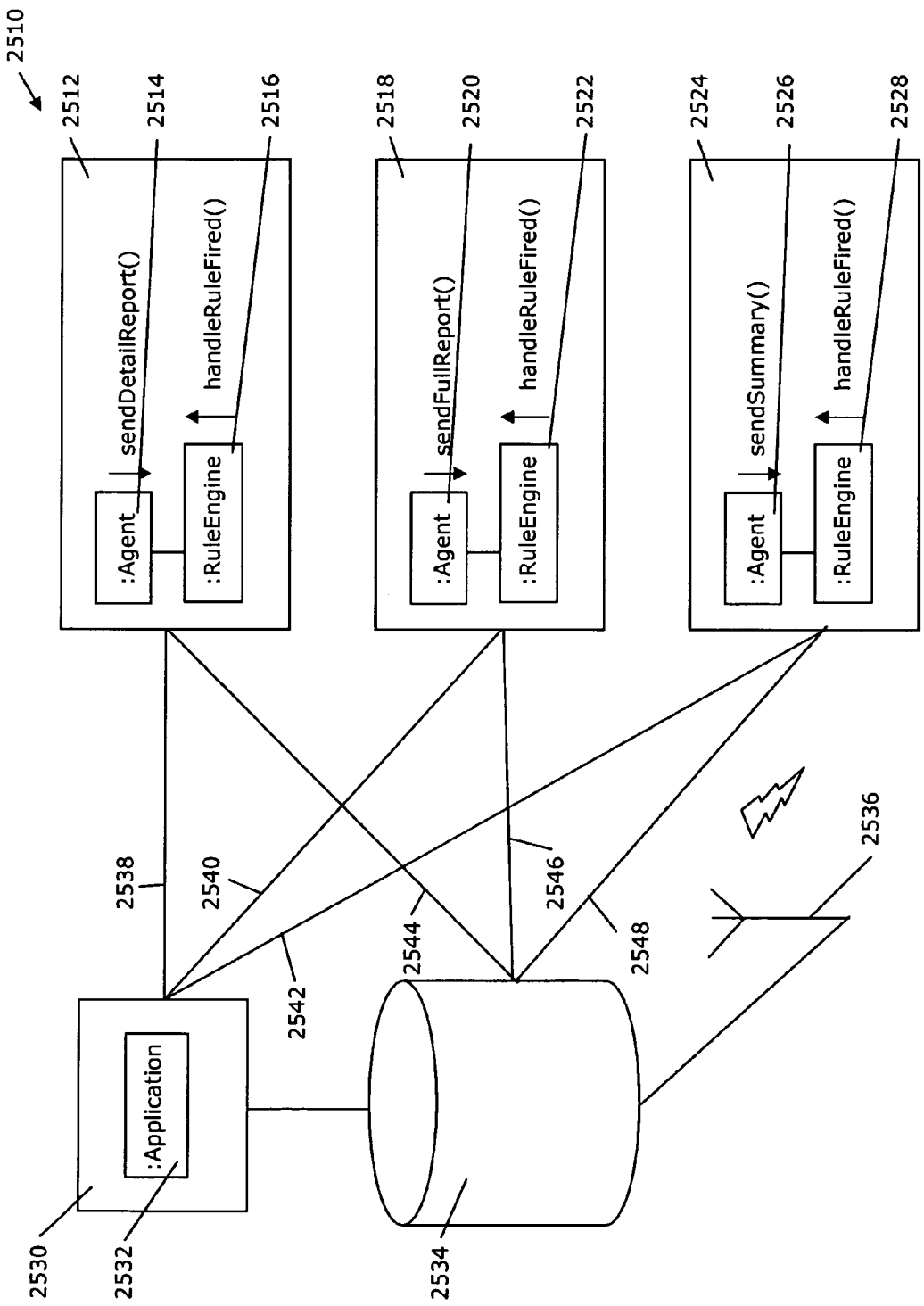
FIG. 25 is a diagram illustrating an exemplary process of an agent using a set of data narrowing rules to determine how much data should be sent over the network.

Referring now to FIG. 25, a diagram illustrating an exemplary process of the of an agent using a set of data narrowing rules to determine how much data should be sent over the network is shown. This diagram shows the same agent in three different scenarios. As before, each agent is communicating with an application 2532 that in this case is hosted on server 2530 which is connected to a high-speed data network, 2534. In the first scenario, the agent 2514 has been constructed on or moved to server execution environment 2512, which is connected to the high speed data network directly via a gigabit ethernet link 2544. The agent 2514 utilized a rule-based system that is driven by the associated rule engine 2516. This engine 2516 has been loaded with execution environment specific rules about the current network bandwidth capabilities of the execution environment 2512. In this example the agent 106 completes a task which will ultimately generate a report back to the application 2532 on execution environment 2530. When that task completes, that event causes a rule to fire in the engine 2516, which instructs the agent 2514 to send a detailed report. In this case, a detailed report is appropriate because a high bandwidth connection is available between the agent 2514 and the application 2532.

In the second scenario, that same agent now labeled 114 has moved to a home computer 2518 which is connected to the network via a DSL connection 2546. As before, the engine 2522 is loaded with the execution environment specific rules regarding bandwidth available to the execution environment. As the agent 2520 completes its task, the event causes a rule to fire, which instructs agent 2520 to send a full report, which contains less data than the detailed report described previously. Note, that the agent 2520 is not compressing the same data, but sending a different data-set back—a subset of the data to fit the bandwidth available.

In the final scenario, the agent, now labeled 2526 has moved to the mobile device 2524. The mobile device is connected to the high speed data network via a relatively low speed cellular data network 2536. As before, the agent 2526 completes its task which results in the rule engine 2528 firing a rule. This firing causes the agent 2526 to dispatch a much smaller summary report to the application 2532 in order to accommodate the low bandwidth connection.

Methods, computer readable media and systems have been shown and/or described in the above embodiments for constructing an agent that utilizes a compiled set of canonical rules. Although the above descriptions set forth preferred embodiments, it will be understood that there is no intent to limit the invention by such disclosure, but rather, it is intended to cover all modifications and alternate implementations falling within the spirit and scope of the invention. For example, the present invention should not be limited to a single agent, or to a particular programming language for the execution environment. Furthermore, the association of agent to execution environments is not limited to the topology depicted. Lastly, the embodiments are intended to cover capabilities and concepts whether they be via a loosely couple set of components or they be converged into one or more integrated components, devices, circuits, and/or software programs.

What is claimed is:

1. A device-implemented method comprising:
   constructing an agent in an execution environment embodied on a device that utilizes a set of compiled, canonical rules, by at least:
      requesting a non-compiled, canonical rule set for the agent from a rule repository;
      compiling the canonical rule set; and
      supplying the agent with a compiled canonical rule set;
      creating a rule engine that is to be used to execute the compiled canonical rule set.

2. The method of claim 1 wherein the requesting of in the non-compiled, canonical rule set is performed by an application.

3. The method of claim 1 further comprising requesting compilation of the canonical rule set from a compiler.

4. The method of claim 1 further comprising requesting the compiled canonical rule set from a rule server.

5. The method of claim 4 wherein the rule server requests compilation of the canonical rule set from a compiler.

6. The method of claim 1 further comprising passing the compiled rule set to the agent during construction of the agent.

7. The method of claim 2 wherein the application is in a second execution environment.

8. The method of claim 7 wherein the rule repository in a third execution environment.

9. A computer readable medium having stored thereon, computer-executable instructions that, if executed by a device, cause the device to perform a method comprising:
   initiating construction of an agent in an execution environment;
   requesting a set of compiled rules for the agent;
   creating a rule engine;
   passing a compiled rule set to the rule engine; and
   requesting a working memory from the rule engine.

10. The computer readable medium of claim 9, wherein the computer-executable instructions, if executed by the device, cause the device to perform a method further comprising supplying a location of a rule server to the agent during construction.

11. The computer readable medium of claim 9, wherein the computer-executable instructions, if executed by the device, cause the device to perform a method further comprising requesting the set of compiled rules from a supplied rule server.

12. The computer readable medium of claim 11 wherein the supplied rule server is in a second execution environment.

13. The computer readable medium of claim 9 wherein the rule engine is created during agent construction.

14. The computer readable medium of claim 9, wherein the computer-executable instructions, if executed by the device, cause the device to perform a method further comprising locating the rule engine during agent construction.

15. The computer readable medium of claim 9 wherein the agent requests the working memory from the rule engine.

16. A system, comprising:
   a memory configured to store a working memory; and
   a processor configured to be communicably coupled to the memory, wherein the processor is configured to:
      in response to a request for agent construction received from an application, construct an agent with a set of compiled, canonical rules, by at least:
         locating a canonical rule set;
         requesting compilation of the canonical rule set;
         passing a compiled canonical rule set to the agent;
         locating a rule engine;
         supplying the rule engine with the compiled canonical rule set; and
         requesting the working memory from the rule engine
      wherein the application resides in an execution environment different from an execution environment in which the agent resides.

17. The system of claim 16
   receiving a response containing the compiled canonical rule set for the agent from an execution environment that is different from the execution environment in which the agent resides.

* * * * *

UNITED STATES PATENT AND TRADEMARK OFFICE
CERTIFICATE OF CORRECTION

PATENT NO.        : 7,702,603 B1
APPLICATION NO. : 11/645302
DATED             : April 20, 2010
INVENTOR(S)       : Robert R. Hauser It is certified that error appears in the above-identified patent and that said Letters Patent is hereby corrected as shown below:

In column 17, line 32, in Claim 2, delete "in the" and insert -- the --, therefor.

Signed and Sealed this

Second Day of November, 2010

David J. Kappos
*Director of the United States Patent and Trademark Office*